(12) United States Patent
Wang et al.

(10) Patent No.: US 11,930,260 B2
(45) Date of Patent: Mar. 12, 2024

(54) OPTICAL PATH SWITCHING METHOD AND SURVEILLANCE MODULE

(71) Applicant: HUAWEI TECHNOLOGIES CO., LTD., Guangdong (CN)

(72) Inventors: Qingping Wang, Shenzhen (CN); Hongqi Hu, Hangzhou (CN); Ruihua Li, Shenzhen (CN); Changcai Lai, Shenzhen (CN); Shisheng Zheng, Hangzhou (CN); Yanlin Song, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 150 days.

(21) Appl. No.: 17/730,426

(22) Filed: Apr. 27, 2022

(65) Prior Publication Data
US 2022/0263989 A1    Aug. 18, 2022

Related U.S. Application Data

(63) Continuation of application No. PCT/CN2020/123719, filed on Oct. 26, 2020.

(30) Foreign Application Priority Data

Oct. 28, 2019   (CN) .......................... 201911032809.1
Aug. 11, 2020   (CN) .......................... 202010811207.2

(51) Int. Cl.
*H04N 23/55*    (2023.01)
*G02B 5/08*     (2006.01)
(Continued)

(52) U.S. Cl.
CPC ........... *H04N 23/55* (2023.01); *G02B 5/0883* (2013.01); *G02F 1/163* (2013.01); *G03B 19/12* (2013.01)

(58) Field of Classification Search
CPC ........ H04N 23/55; H04N 23/61; H04N 23/66; H04N 23/667; H04N 23/69; H04N 23/695;
(Continued)

(56) References Cited

U.S. PATENT DOCUMENTS

| 8,403,494 B2* | 3/2013 | Kojima ................ G03B 21/208 |
| | | 353/38 |
| 2008/0088942 A1* | 4/2008 | Seo ....................... G02B 15/142 |
| | | 359/672 |

(Continued)

FOREIGN PATENT DOCUMENTS

| CN | 102213822 A | 10/2011 |
| CN | 205750068 U | 11/2016 |

(Continued)

OTHER PUBLICATIONS

Office Action dated Jun. 22, 2022 issued for Chinese Application No. 202010811207.2 (5 pages).
International Search Report dated Jan. 8, 2021 for International Application No. PCT/CN2020/123719 (10 pages).
Extended European Search Report dated Nov. 3, 2022 issued for European Application No. 20881908.6 (12 pages).

*Primary Examiner* — Yogesh K Aggarwal

(57) ABSTRACT

An optical path switching method is applied to a surveillance module. The method includes: determining a target magnification; and (i) when the target magnification is less than or equal to a maximum magnification of a camera, setting a magnification of the camera to the target magnification, determining that a reflection element is at a first location or in a first working state, and performing image capture by using the camera alone; or (ii) when the target magnification is greater than a maximum magnification of the camera, setting a magnification of the camera to a first magnification, determining that the reflection element is at a second location or in a second working state, and performing image capture by using both the camera and a teleconverter, where a product of the first magnification and a magnifica-
(Continued)

tion of the teleconverter is the target magnification. The method increases a surveillance distance while reducing costs.

20 Claims, 14 Drawing Sheets

(51) Int. Cl.
*G02F 1/163* (2006.01)
*G03B 19/12* (2021.01)

(58) Field of Classification Search
CPC .......... H04N 7/18; H04N 23/45; H04N 23/67; G02B 5/0883; G02B 7/102; G02B 26/0816; G02B 13/0065; G02F 1/163; G03B 19/12; G03B 5/00; G03B 17/17; G03B 2205/0046

See application file for complete search history.

(56) References Cited

U.S. PATENT DOCUMENTS

| | | |
|---|---|---|
| 2014/0124373 A1 | 5/2014 | Chen et al. |
| 2019/0235202 A1 | 8/2019 | Smyth et al. |

FOREIGN PATENT DOCUMENTS

| | | |
|---|---|---|
| CN | 107483791 A | 12/2017 |
| CN | 109061864 A | 12/2018 |
| CN | 208739252 U | 4/2019 |
| CN | 208739253 U | 4/2019 |
| EP | 2442167 A2 | 4/2012 |
| JP | H10254055 A | 9/1998 |
| WO | 2014021092 A1 | 2/2014 |

\* cited by examiner

OPTICAL PATH SWITCHING METHOD AND SURVEILLANCE MODULE

CROSS-REFERENCE TO RELATED APPLICATIONS

This application is a continuation of International Application No. PCT/CN2020/123719, filed on Oct. 26, 2020, which claims priority to Chinese Patent Application No. 202010811207.2, filed on Aug. 11, 2020 and Chinese Patent Application No. 201911032809.1, filed on Oct. 28, 2019. All of the aforementioned patent applications are hereby incorporated by reference in their entireties.

TECHNICAL FIELD

This disclosure relates to the optical imaging field, and in particular, to an optical path switching method and a surveillance module.

BACKGROUND

At present, cameras commonly used in surveillance modules in the security protection field include a monocular camera, a multiocular camera, or a dome-shaped camera. These cameras have intelligent video analysis functions, such as motion detection, line crossing detection, area intrusion detection, and loitering detection.

A video analysis function of a surveillance module is powerful, but there are some application disadvantages. When a monocular camera uses a long-focus lens, details can be captured from a long distance. However, a surveillance range is limited due to a small field of view. A wide-angle lens used has a large field of view and a large surveillance range, but captures details from a long distance unclearly. A multiocular camera can cover some long focal length ranges and some short focal length ranges, but a coverage distance of the long focus part is not far enough.

In urban security protection scenarios, a video surveillance module imposes increasing high requirements on "viewing entirely" (performing surveillance on an overall situation in a large range) and "viewing clearly" (clearly viewing valuable details from a long distance). In application scenarios such as large-range surveillance and high-point surveillance, a distance that can be covered by a selected focal length range of a camera of an existing surveillance module is limited, and target details from a farther distance cannot be clearly presented. When a volume of the surveillance module is reduced and costs are reduced, a growing requirement for clear details surveillance of a long-distance target cannot be satisfied.

SUMMARY

This disclosure provides an optical path switching method and a surveillance module, to implement the following objectives: Requirements of performing surveillance on an overall situation in a large range and clearly viewing valuable details from a long distance are satisfied, a surveillance distance of the surveillance module is significantly increased, and clear image details can still be captured from a long distance while reducing a volume of the surveillance module and reducing costs.

According to a first aspect of this disclosure, an optical path switching method is provided. The optical path switching method is applied to a surveillance module, the surveillance module includes a camera, a teleconverter, a switching element, and a reflection element, the camera uses a zoom lens, the teleconverter uses a fixed-focus lens and is of optical path folding structure, an emergent optical axis of the teleconverter is unparallel to an incident optical axis of the camera, an incident optical axis of the teleconverter is parallel to the incident optical axis of the camera, the switching element is configured to change a location or a working status of the reflection element, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture; and the method includes:

determining a target magnification; and when the target magnification is less than or equal to a maximum magnification of the camera, setting a magnification of the camera to the target magnification; and setting the reflection element to be at the first location or in the first working state, and performing image capture by using the camera; or when the target magnification is greater than a maximum magnification of the camera, setting a magnification of the camera to a first magnification, where a product of the first magnification and a magnification of the teleconverter is the target magnification, and the target magnification is not greater than a product of the maximum magnification of the camera and the first magnification; and setting the reflection element to be at the second location or in the second working state, and performing image capture by using both the camera and the teleconverter.

When the optical path switching method provided in the first aspect of this disclosure is applied to the surveillance module, a surveillance distance of the surveillance module can be significantly increased while reducing a volume of the surveillance module and reducing costs.

According to the first aspect, in a first possible implementation of the first aspect, the determining a target magnification includes:

determining an object size proportion of a target object in a currently captured image; and determining the target magnification based on the object size proportion, where a smaller object size proportion indicates a larger target magnification.

The target magnification is determined based on the object size proportion of the target object in the currently captured image, so that the surveillance module can better adapt to the target, and definition of the surveillance target can be improved.

According to the first aspect or the first possible implementation of the first aspect, in a second possible implementation of the first aspect, the determining a target magnification includes:

determining a type of a target object; and determining the target magnification based on the type of the target object, where there is a correspondence between the type of the target object and the target magnification.

The target magnification is determined based on the type of the target object, so that the surveillance module can better adapt to the target, and definition of the surveillance target can be improved.

According to any one of the first aspect or the first and second possible implementations of the first aspect, in a third possible implementation of the first aspect, the determining a target magnification includes:

receiving a magnification input instruction; and determining the target magnification according to the magnification input instruction.

The target magnification is determined according to the received magnification input instruction, so that the surveillance module can better adapt to a target, and definition of the surveillance target can be improved.

According to any one of the first aspect or the first to the third possible implementations of the first aspect, in a fourth possible implementation of the first aspect, a magnification range of the camera is [1, M], the magnification of the teleconverter is N, and M and N are integers greater than 1.

According to any one of the first aspect or the first to the fourth possible implementations of the first aspect, in a fifth possible implementation of the first aspect, a value range of M includes [2, 30], and a value range of N includes [2, 5].

According to any one of the first aspect or the first to the fifth possible implementations of the first aspect, in a sixth possible implementation of the first aspect, the teleconverter includes K teleconverters, and a structure of at least one teleconverter is optical path folding structure. The volume of the surveillance module can be reduced by using the teleconverter that is of the optical path folding structure.

According to a second aspect of this disclosure, a surveillance module is provided. The surveillance module includes:

a camera, a teleconverter, a switching element, and a reflection element;

the camera uses a zoom lens;

the teleconverter uses a fixed-focus lens and is of optical path folding structure, an emergent optical axis of the teleconverter is unparallel to an incident optical axis of the camera, and an incident optical axis of the teleconverter is parallel to the incident optical axis of the camera; and the switching element is configured to change a location or a working status of the reflection element, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture. By using an optical path foldable multiocular camera provided in the second aspect of this disclosure, a surveillance distance of the multiocular camera can be significantly increased while reducing a volume of the multiocular camera and reducing costs.

According to the second aspect, in a first possible implementation of the second aspect, a magnification range of the camera is [1, M], a magnification of the teleconverter is N, and M and N are integers greater than 1.

According to the second aspect or the first possible implementation of the second aspect, in a second possible implementation of the second aspect, a value range of M includes [2, 30], and a value range of N includes [2, 5].

According to any one of the second aspect or the first and the second possible implementations of the second aspect, in a third possible implementation of the second aspect, the teleconverter includes K teleconverters, and a structure of at least one teleconverter is optical path folding structure. A volume of the surveillance module can be reduced by using the teleconverter that is of the optical path folding structure.

According to a third aspect of this disclosure, an optical path foldable apparatus is provided. The optical path foldable apparatus is applied to a surveillance module, the surveillance module includes a camera, a teleconverter, a switching element, and a reflection element, the camera uses a zoom lens, the teleconverter uses a fixed-focus lens and is of optical path folding structure, an emergent optical axis of the teleconverter is unparallel to an incident optical axis of the camera, an incident optical axis of the teleconverter is parallel to the incident optical axis of the camera, the switching element is configured to change a location or a working status of the reflection element, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture; and an optical path switching apparatus includes:

a switching module, where the switching module includes a reflection module, the reflection module includes a reflection mirror or a prism, the switching module is connected to both the teleconverter and a camera module, and the switching module is configured to switch a location or a status of the reflection module, to switch between two working states, that is, a state in which the camera module works alone and a state in which the camera module and the teleconverter work together, where in the state in which the camera module works alone, light enters from the camera module, or in the state in which the camera module and the teleconverter work together, light enters from the teleconverter, and enters the camera module after being reflected by the reflection module of the switching module; and a control module, configured to control the switching module to switch between working states.

The optical path foldable apparatus provided in the third aspect of this disclosure may be applied to a multiocular camera or a dome-shaped camera in the surveillance field, so that a surveillance distance of the surveillance camera can be significantly increased while reducing a volume of the camera and reducing costs.

According to the third aspect, in a first possible implementation of the third aspect, when a target size is less than a threshold size or a distance between a target and the camera module is greater than a focal range of the camera module, the control module controls the switching module to switch to the state in which the camera module and the teleconverter work together. The state in which the camera module and the teleconverter work together can make the surveillance target with insufficient definition when the camera module works alone become clear.

According to the third aspect or the first possible implementation of the third aspect, in a second possible implementation of the third aspect, the switching module includes a switching module that is of a magnetic switching reflection-mirror structure, where the switching module that is of the magnetic switching reflection-mirror structure includes an iron core wound with a coil and the reflection mirror fastened with a magnet, and mutual repulsion or attraction between the iron core wound with the coil and the reflection mirror fastened with the magnet are respectively corresponding to the state in which the camera module works alone or the state in which the camera module and the teleconverter work together. The switching module that is of the magnetic switching reflection-mirror structure can conveniently switch between two different working states by using magnetic characteristics.

According to any one of the third aspect or the first and the second possible implementations of the third aspect, in a third possible implementation of the third aspect, the switching module includes a switching module that is of a translation reflection-mirror structure, where the switching module that is of the translation reflection-mirror structure includes a translation driving module and the reflection mirror, the translation driving module is configured to translate a location of the reflection mirror, and when the location of the reflection mirror overlaps an optical path in which light enters from the camera module, the switching module switches to the state in which the camera module and the teleconverter work together, or when the location of the reflection mirror does not overlap an optical path in which light enters from the camera module, the switching module switches to the state in which the camera module works alone. The switching module that is of the translation reflection-mirror structure can conveniently switch between two different working states by using the translation driving module.

According to any one of the third aspect or the first to the third possible implementations of the third aspect, in a fourth possible implementation of the third aspect, the switching module includes a switching module that is of a rotation reflection-mirror structure, where the switching module that is of the rotation reflection-mirror structure includes a rotation driving module and the reflection mirror, the rotation driving module is configured to rotate a location of the reflection mirror, and when the location of the reflection mirror overlaps an optical path in which light enters from the camera module, the switching module switches to the state in which the camera module and the teleconverter work together, or when the location of the reflection mirror does not overlap an optical path in which light enters from the camera module, the switching module switches to the state in which the camera module works alone. The switching module that is of the rotation reflection-mirror structure can conveniently switch between two different working states by using the rotation driving module.

According to any one of the third aspect or the first to the fourth possible implementations of the third aspect, in a fifth possible implementation of the third aspect, the switching module includes a switching module that is of an electrochromic material glass structure, where the switching module that is of the electrochromic material glass structure includes electrochromic material glass, the electrochromic material is in a transparent state and is equivalent to glass when not being energized, and light enters from the camera module; or the electrochromic material is in a reflection mirror state when being energized, and light enters from the teleconverter, and enters the camera module after being reflected by the reflection module of the switching module. The switching module that is of the electrochromic material glass structure can conveniently switch between two different working states based on whether the electrochromic material glass is energized.

According to a fourth aspect of this disclosure, an optical path foldable multiocular camera is provided. The optical path foldable multiocular camera includes a primary camera module, a primary camera image sensor connected to the primary camera module, a teleconverter, at least one secondary camera module, a secondary camera image sensor connected to the at least one secondary camera module, a switching module, and a control module, where
  the primary camera module includes a lens, configured to image target light on the primary camera image sensor;
  the at least one secondary camera module includes a lens, configured to image target light on the secondary camera image sensor;
  the primary camera image sensor or the secondary camera image sensor is configured to capture a target image;
  the teleconverter is configured to multiply a focal length of the lens that is of the primary camera module or the secondary camera module;
  the switching module includes a reflection module, the reflection module includes a reflection mirror or a prism, the switching module is connected to both the teleconverter and a camera module, and the switching module is configured to switch a location or a status of the reflection module, to switch between two working states, that is, a state in which the camera module works alone and a state in which the camera module and the teleconverter work together, where
  in the state in which the camera module works alone, light enters from the camera module, or in the state in which the camera module and the teleconverter work together, light enters from the teleconverter, and enters the camera module after being reflected by the reflection module of the switching module; and
  the control module is configured to control the switching module to switch between working states.

By using the optical path foldable multiocular camera provided in the fourth aspect of this disclosure, a surveillance distance of the multiocular camera can be significantly increased while reducing a volume of the multiocular camera and reducing costs.

According to the fourth aspect, in a first possible implementation of the fourth aspect, the camera module includes any one of the at least one secondary camera module.

According to the fourth aspect or the first possible implementation of the fourth aspect, in a second possible implementation of the fourth aspect, a field of view of the lens of the primary camera module is greater than a field of view of the lens of the any secondary camera module.

According to any one of the fourth aspect or the first and the second possible implementations of the fourth aspect, in a third possible implementation of the fourth aspect, when detecting that a target size is less than a threshold size, the control module controls the switching module to switch to the state in which the camera module and the teleconverter work together. The state in which the camera module and the teleconverter work together can make a surveillance target with insufficient definition when the camera module works alone become clear.

According to any one of the fourth aspect or the first to the third possible implementations of the fourth aspect, in a fourth possible implementation of the fourth aspect, the optical path foldable multiocular camera may further include a multi-channel image processing module, where the multi-channel image processing module is configured to perform image processing on image data collected by the primary camera image sensor and/or the at least one secondary camera image sensor, and the image processing includes mosaic, automatic exposure, automatic white balance, autofocus, color correction, sharpening enhancement, or noise reduction.

According to any one of the fourth aspect or the first to the fourth possible implementations of the fourth aspect, in a fifth possible implementation of the fourth aspect, the optical path foldable multiocular camera may further include a multiocular collaborative processing module, configured to collaboratively process image data or video data shot by the primary camera module and the at least one secondary camera module.

According to any one of the fourth aspect or the first to the fifth possible implementations of the fourth aspect, in a sixth possible implementation of the fourth aspect, the optical path foldable multiocular camera may further include a video/image encoding module, where the video/image encoding module is configured to perform image encoding or video encoding on image data or video data obtained after image processing.

According to any one of the fourth aspect or the first to the sixth possible implementations of the fourth aspect, in a seventh possible implementation of the fourth aspect, the optical path foldable multiocular camera may further include a transmission module, where the transmission module is configured to transmit encoded image data or video data.

According to any one of the fourth aspect or the first to the seventh possible implementations of the fourth aspect, in an eighth possible implementation of the fourth aspect, the optical path foldable multiocular camera may further include a display module, where the display module is configured to decode the transmitted encoded video data or image data and display decoded video data or image data.

According to a fifth aspect of this disclosure, an optical path foldable dome-shaped camera is provided. The optical path foldable dome-shaped camera includes a teleconverter, a camera module, an image sensor connected to the camera module, a switching module, and a control module, where
  the teleconverter is configured to multiply a focal length of a lens of the camera module;
  the camera module includes the lens, configured to image target light on the image sensor;
  the image sensor is configured to capture a target image;
  the switching module includes a reflection module, the reflection module includes a reflection mirror or a prism, the switching module is connected to both the teleconverter and the camera module, and the switching module is configured to switch a location or a status of the reflection module, to switch between two working states, that is, a state in which the camera module works alone and a state in which the camera module and the teleconverter work together, where
  in the state in which the camera module works alone, light enters from the camera module, or in the state in which the camera module and the teleconverter work together, light enters from the teleconverter, and enters the camera module after being reflected by the reflection module of the switching module; and
  the control module controls the switching module to switch between working states.

By using the optical path foldable dome-shaped camera provided in the fifth aspect of this disclosure, a surveillance distance of the dome-shaped camera can be significantly increased while reducing a volume of the dome-shaped camera and reducing costs.

According to the fifth aspect, in a first possible implementation of the fifth aspect, the dome-shaped camera may further include a pan-tilt-zoom, the pan-tilt-zoom is connected to the camera module, and the pan-tilt-zoom enables, under the control of the control module, the camera module to perform horizontal rotation and vertical rotation. The pan-tilt-zoom enables the camera module to adjust a photographing direction conveniently.

According to the fifth aspect or the first possible implementation of the fifth aspect, in a second possible implementation of the fifth aspect, the camera module uses a zoom lens, and a change range of the focal length of the zoom lens is 4 mm to 150 mm.

According to any one of the fifth aspect or the first and the second possible implementations of the fifth aspect, in a third possible implementation of the fifth aspect, the teleconverter includes one or K teleconverters, and structures of the K teleconverters constitute an optical path multi-folding structure. An advantage of the K teleconverters lies in that a magnification can be adaptively adjusted based on a surveillance environment.

According to any one of the fifth aspect or the first to the third possible implementations of the fifth aspect, in a fourth possible implementation of the fifth aspect, the optical path foldable dome-shaped camera may further include a fixed reflection module, where the fixed reflection module includes a reflection mirror or a prism, and the fixed reflection module is configured to fold an optical path between the K teleconverters. The fixed reflection module can further fold the optical path and reduce the volume of the dome-shaped camera.

According to any one of the fifth aspect or the first to the fourth possible implementations of the fifth aspect, in a fifth possible implementation of the fifth aspect, when detecting that a distance between a target and the camera module is greater than a focal range of the camera module, the control module controls the switching module to switch to the state in which the camera module and the teleconverter work together. The state in which the camera module and the teleconverter work together can make the surveillance target with insufficient definition when the camera module works alone become clear.

According to any one of the fifth aspect or the first to the fifth possible implementations of the fifth aspect, in a sixth possible implementation of the fifth aspect, the control module is further configured to:
  select a working mode, where the working mode includes a manual mode, a preset location scanning mode, or an automatic mode.

According to any one of the fifth aspect or the first to the sixth possible implementations of the fifth aspect, in a seventh possible implementation of the fifth aspect, the optical path foldable dome-shaped camera may further include an image processing module, where the image processing module is configured to perform image processing on image data collected by the image sensor, and the image processing includes mosaic, automatic exposure, automatic white balance, auto-focus, color correction, sharpening enhancement, or noise reduction.

According to any one of the fifth aspect or the first to the seventh possible implementations of the fifth aspect, in an eighth possible implementation of the fifth aspect, the optical path foldable dome-shaped camera may further include a video/image encoding module, where the video/image encoding module is configured to perform image encoding or video encoding on image data or video data obtained after image processing.

According to any one of the fifth aspect or the first to the eighth possible implementations of the fifth aspect, in a ninth possible implementation of the fifth aspect, the optical path foldable dome-shaped camera may further include a transmission module, where the transmission module is configured to transmit encoded image data or video data.

According to any one of the fifth aspect or the first to the ninth possible implementations of the fifth aspect, in a tenth possible implementation of the fifth aspect, the optical path foldable dome-shaped camera may further include a display module, where the display module is configured to decode the transmitted encoded video data or image data and display decoded video data or image data.

According to a sixth aspect of this disclosure, an optical path foldable method is provided. The optical path foldable method is applied to a multiocular camera or a dome-shaped camera, and includes:

detecting a target size or a distance between a target and a camera module;

controlling a switching module to switch between working states, where the working states include a state in which the camera module works alone and a state in which the camera module and a teleconverter work together, where in the state in which the camera module works alone, light enters from the camera module, or in the state in which the camera module and the teleconverter work together, light enters from the teleconverter, and enters the camera module after being reflected by a reflection module of the switching module; and when detecting the target size is less than a threshold size or the distance between the target and the camera module is greater than a focal range of the camera module, controlling the switching module to switch to the state in which the camera module and the teleconverter work together.

The optical path foldable method provided in the sixth aspect of this disclosure may be applied to a multiocular camera or a dome-shaped camera in the surveillance field, so that a surveillance distance of the surveillance camera can be significantly increased while reducing a volume of the camera and reducing costs.

According to a seventh aspect of this disclosure, an optical path switching apparatus is provided. The optical path switching apparatus is applied to a surveillance module, the surveillance module includes a camera, a teleconverter, a switching element, and a reflection element, the camera uses a zoom lens, the teleconverter uses a fixed-focus lens and is of optical path folding structure, an emergent optical axis of the teleconverter is unparallel to an incident optical axis of the camera, an incident optical axis of the teleconverter is parallel to the incident optical axis of the camera, the switching element is configured to change a location or a working status of the reflection element, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture; and the apparatus includes:

a determining module, configured to determine a target magnification; and a control module, configured to: when the target magnification is less than or equal to a maximum magnification of the camera, set a magnification of the camera to the target magnification; and set the reflection element to be at the first location or in the first working state, and perform image capture by using the camera; or when the target magnification is greater than a maximum magnification of the camera, set a magnification of the camera to a first magnification, where a product of the first magnification and a magnification of the teleconverter is the target magnification, and the target magnification is not greater than a product of the maximum magnification of the camera and the first magnification; and set the reflection element to be at the second location or in the second working state, and perform image capture by using both the camera and the teleconverter. When the optical path switching apparatus provided in the seventh aspect of this disclosure is applied to the surveillance module, a surveillance distance of the surveillance module can be significantly increased while reducing a volume of the surveillance module and reducing costs.

According to the seventh aspect, in a first possible implementation of the seventh aspect, the determining module is specifically configured to:

determine an object size proportion of a target object in a currently captured image; and determine the target magnification based on the object size proportion, where a smaller object size proportion indicates a larger target magnification.

The target magnification is determined based on the object size proportion of the target object in the currently captured image, so that the surveillance module can better adapt to the target, and definition of the surveillance target can be improved.

According to the seventh aspect or the first possible implementation of the seventh aspect, in a second possible implementation of the seventh aspect, the determining module is specifically configured to:

determine a type of a target object; and determine the target magnification based on the type of the target object, where there is a correspondence between the type of the target object and the target magnification.

The target magnification is determined based on the type of the target object, so that the surveillance module can better adapt to the target, and definition of the surveillance target can be improved.

According to any one of the seventh aspect or the first and the second possible implementations of the seventh aspect, in a third possible implementation of the seventh aspect, the determining module is specifically configured to:

receive a magnification input instruction; and determine the target magnification according to the magnification input instruction.

The target magnification is determined according to the received magnification input instruction, so that the surveillance module can better adapt to a target, and definition of the surveillance target can be improved.

According to any one of the seventh aspect or the first to the third possible implementations of the seventh aspect, in a fourth possible implementation of the seventh aspect, a magnification range of the camera is [1, M], the magnification of the teleconverter is N, and M and N are integers greater than 1.

According to any one of the seventh aspect or the first to the fourth possible implementations of the seventh aspect, in a fifth possible implementation of the seventh aspect, a value range of M includes [2, 30], and a value range of N includes [2, 5].

According to any one of the seventh aspect or the first to the fifth possible implementations of the seventh aspect, in a sixth possible implementation of the seventh aspect, the teleconverter includes K teleconverters, and a structure of at least one teleconverter is optical path folding structure. The volume of the surveillance module can be reduced by using the teleconverter that is of the optical path folding structure.

According to an eighth aspect of this disclosure, an electronic device is provided, including a memory and at least one processor connected to the memory, where
the memory is configured to store instructions, and after the instructions are read by the at least one processor, the electronic device performs the method according to the first aspect.

According to a ninth aspect of this disclosure, a computer-readable storage medium is provided. The computer-readable storage medium includes computer instructions, and when the computer instructions are run on a computer, the method according to the first aspect is performed.

These and other aspects of this disclosure are simpler and easier to understand in descriptions of the following plurality of embodiments.

BRIEF DESCRIPTION OF DRAWINGS

To describe technical solutions in embodiments of this disclosure more clearly, the following briefly describes the accompanying drawings required for describing the embodiments. It is clear that the accompanying drawings in the following descriptions show merely some embodiments of this disclosure, and a person of ordinary skill in the art may further derive other accompanying drawings from these accompanying drawings without creative efforts.

DESCRIPTION OF EMBODIMENTS

This disclosure is mainly applied to the surveillance camera field, and in particular, to a surveillance module.

In some scenarios, key terms used in embodiments of this disclosure can be understood as follows:

A teleconverter is an optical component used to increase an optical imaging magnification of a camera, and cannot be used as an independent lens for imaging.

An optical path is a propagation path of light.

A focal length range is a change range of a focal length of a zoom lens.

A multiocular camera is a surveillance imaging device that includes a plurality of lenses and corresponding image sensors, and simultaneously performs surveillance on a plurality of fields of view. Surveillance pictures in the plurality of fields of view may be spliced based on a user requirement to implement complete large field of view surveillance, or may not be spliced. A plurality of lenses of different specifications may be combined freely.

A dome-shaped camera is a device with a rotating pan-tilt-zoom structure that can implement large field of view range surveillance. Three dimensions of PTZ may be changed. In security protection surveillance applications, PTZ is short for pan/tilt/zoom. P indicates horizontal rotation of the pan-tilt-zoom, T indicates vertical rotation of the pan-tilt-zoom, and Z indicates zoom control of a lens. Horizontal and vertical rotation are controlled by motors inside the pan-tilt-zoom, and zoom is controlled by a zoom motor in the lens.

To make the objectives, technical solutions, and advantages of this disclosure clearer, the following further describes this disclosure in detail with reference to the accompanying drawings.

Figure 1:
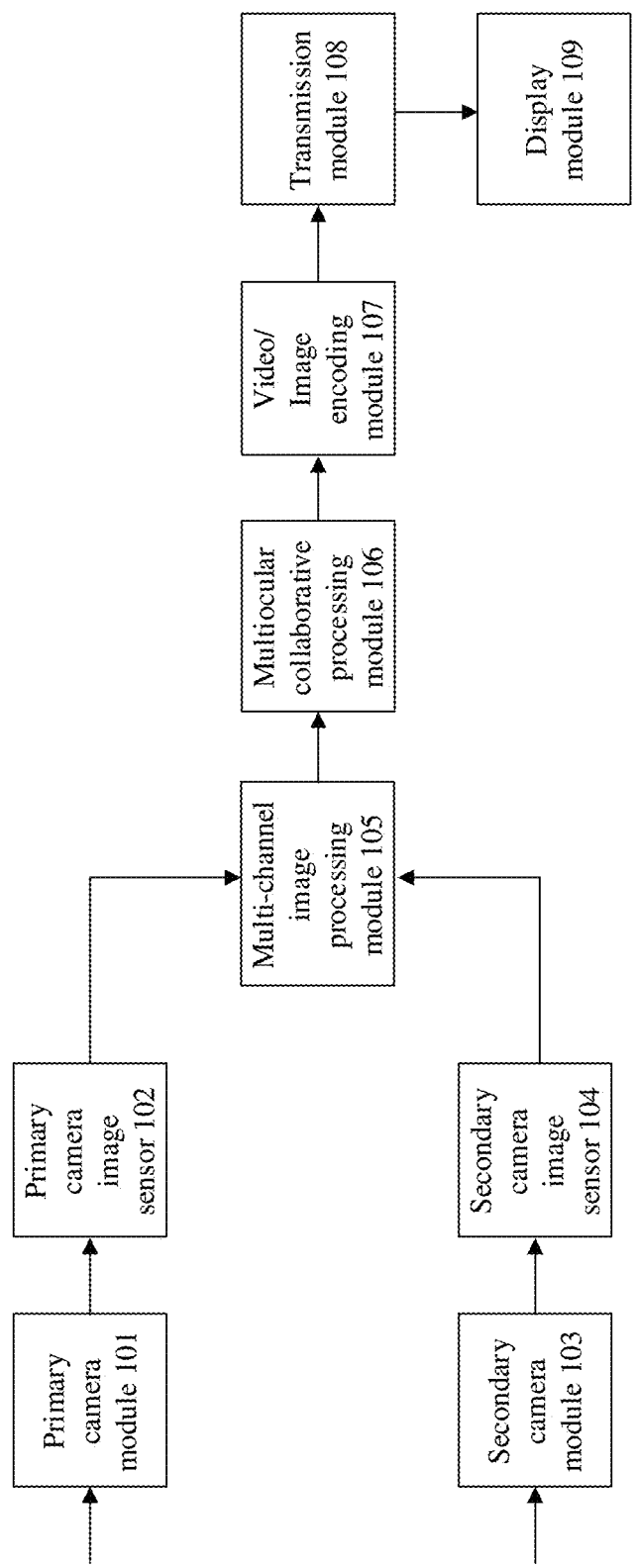
FIG. 1 is a schematic diagram of a structure of a multiocular camera according to Embodiment 1 of this disclosure.

FIG. 1 is a schematic diagram of a structure of a multiocular camera according to an embodiment of this disclosure. The multiocular camera includes a primary camera module 101, a primary camera image sensor 102, a secondary camera module 103, a secondary camera image sensor 104, a multi-channel image processing module 105, a multiocular collaborative processing module 106, a video/image encoding module 107, and a display module 108. After obtaining image information, the primary camera module 101 using a wide-angle lens and the secondary camera module 103 using a long-focus lens convert an image of an analog optical signal into image data of a digital signal on the corresponding primary camera image sensor 102 and secondary camera image sensor 104, respectively. After the multi-channel image processing module 105 performs image processing on the converted image data, the multiocular collaborative processing module 106 performs intelligent analysis on image data obtained after image processing, the video/image encoding module 107 encodes and compresses the image data, a transmission module 108 transmits encoded data to a display module 109, and the display module 109 decodes the image data and displays decoded image data.

Figure 2:
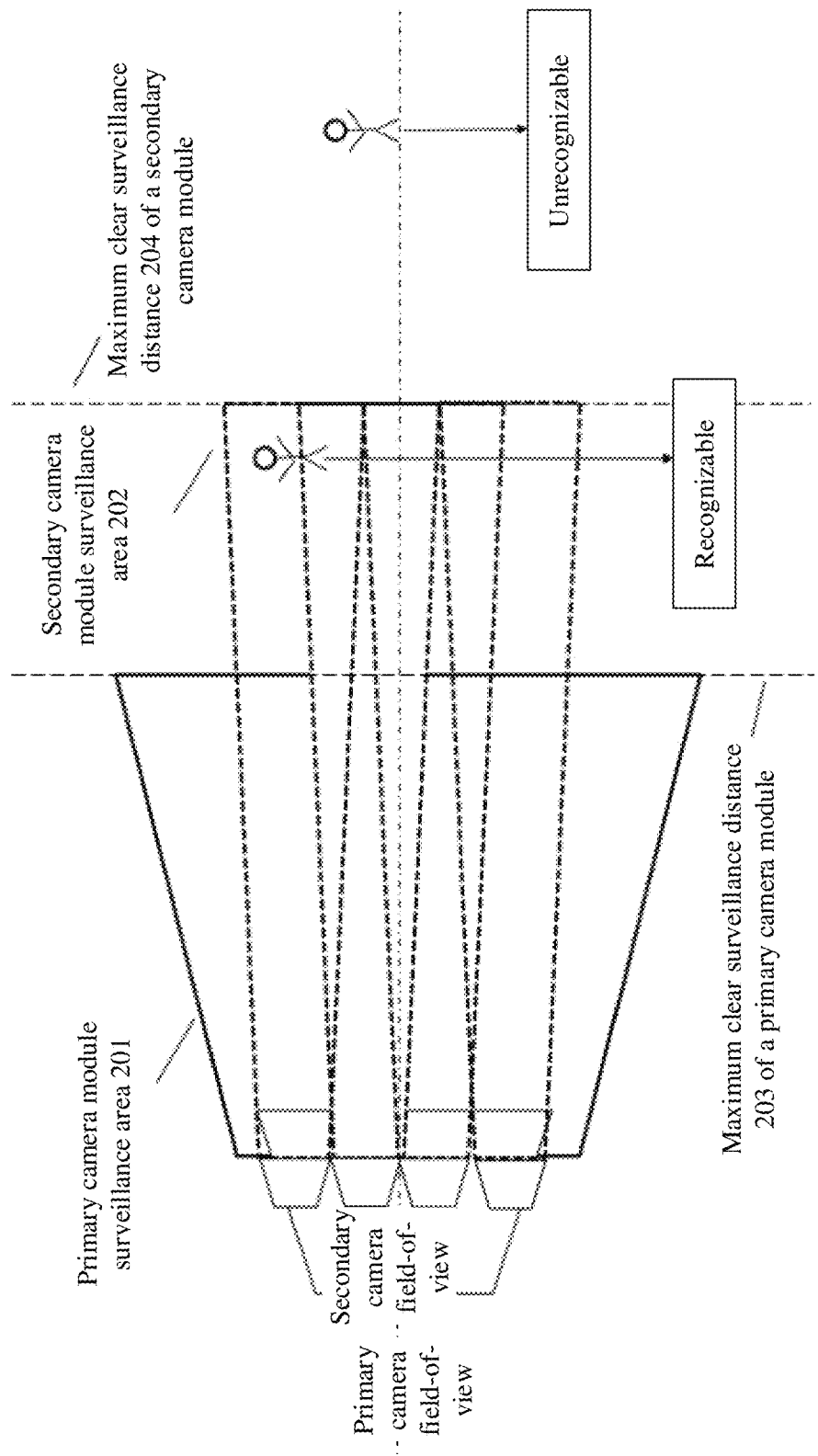
FIG. 2 is a schematic diagram of a surveillance range according to Embodiment 1 of this disclosure.

The primary camera module usually uses a wide-angle camera. The wide-angle camera has a large surveillance range, but a surveillance distance is not enough. After the distance become longer, surveillance details are unclear and difficult to recognize. The secondary camera module usually uses a long-focus camera. The long-focus camera has a small surveillance range, but when the long-focus camera photographs a long-distance object, surveillance details are clear, and definition of the object in a field of view can reach a recognition level. FIG. 2 is a schematic diagram of a surveillance range of a multiocular camera according to an embodiment of this disclosure. A primary camera module surveillance area 201 and a secondary camera module surveillance area 202 of the multiocular camera partially cover each other. When a distance between the surveillance object and the multiocular camera is less than a maximum clear surveillance distance 203 of the wide-angle camera used by the primary camera module, the primary camera can work alone. When a distance between the surveillance object and the multiocular camera is greater than a maximum clear surveillance distance 203 of the wide-angle camera used by the primary camera module and is within the secondary camera module surveillance area 202, the primary camera module and the secondary camera module work together, and the long-focus camera of the secondary camera module is responsible for performing surveillance on objects on which clear surveillance cannot be performed by the wide-angle camera of the primary camera module.

However, a distance that can be covered by a selected focal length range of the long-focus camera of the secondary camera module is limited, and object details from a farther distance cannot be clearly presented. In the schematic diagram of the surveillance range shown in FIG. 2, when the distance between the surveillance object and the multiocular camera is greater than a maximum clear surveillance distance 204 of the long-focus camera used by the secondary camera module, the surveillance object cannot be recognized by the multiocular camera. If the secondary camera module increases a photographing distance by superimposing a plurality of long-focus lenses, because each time one long-focus camera is added, one image sensor is correspondingly added, and correspondingly component costs are also increased.

To resolve the foregoing problem, an embodiment of this disclosure provides an optical path foldable apparatus, to switch, by controlling a location of a reflection mirror, between two working states, that is, a state in which a secondary camera works alone and a state in which the secondary camera and a teleconverter work together. In this way, switching between different focal length ranges is implemented without increasing a quantity of image sensors, that is, without obviously increasing costs, thereby expanding a photographing range of a camera. Next, the technical solution provided in this embodiment of this disclosure is further described by applying the optical path foldable apparatus and method separately to a multiocular camera and a dome-shaped camera. It can be understood that this technical solution may also be applicable to another type of optical path foldable apparatus. For a specific implementation thereof, refer to the following embodiments.

Figure 3:
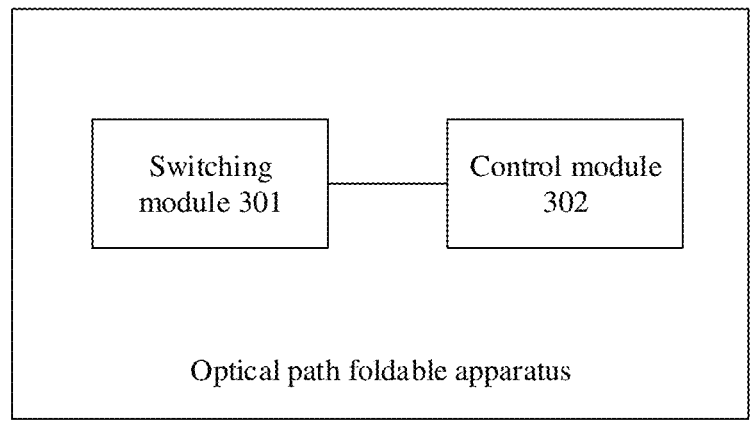
FIG. 3 is a schematic diagram of an optical path foldable apparatus according to Embodiment 1 of this disclosure.

Embodiment 1 of this disclosure provides an optical path foldable apparatus. As shown in FIG. 3, the optical path foldable apparatus includes a switching module 301 and a control module 302, is applied to a multiocular camera, and is configured to fold an optical path, to expand a photographing range of a camera.

The switching module 301 is configured to switch a location or a status of a reflection module, to switch between two working states, that is, a state in which a secondary camera module works alone and a state in which the secondary camera module and a teleconverter work together. The reflection module includes a reflection mirror or a prism. The teleconverter is an optical component that can increase a focal length.

Figure 4:
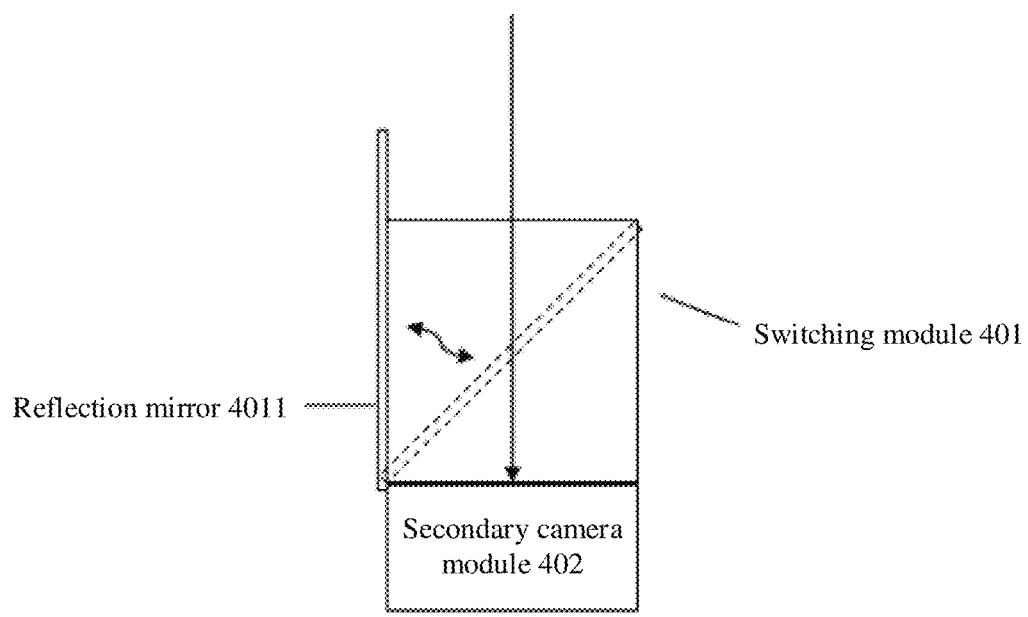
FIG. 4 is a schematic diagram of an optical path in a state in which a secondary camera module works alone according to Embodiment 1 of this disclosure.

Specifically, FIG. 4 is a schematic diagram of an optical path in which a switching module switches to a state in which a secondary camera module works alone. The optical path in the working state is that light is directly incident on the secondary camera module 402 through the switching module 401 without passing through a reflection mirror 4011. The switching module 401 switches to the state in which the secondary camera module works alone.

Figure 5:
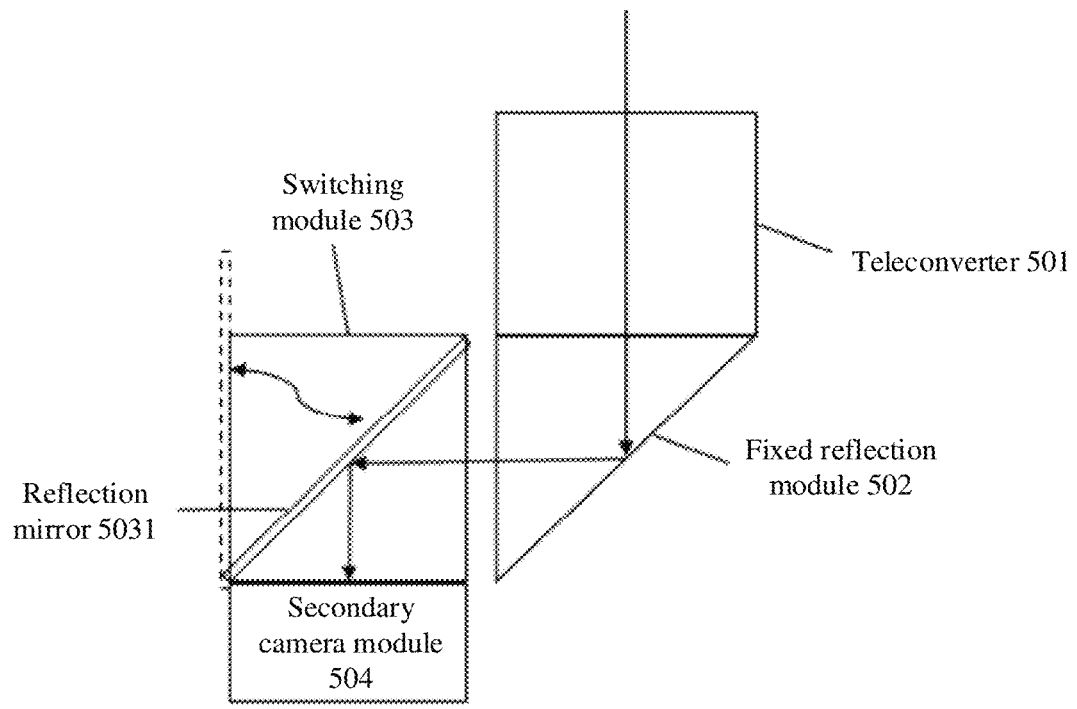
FIG. 5 is a schematic diagram of an optical path in a state in which a secondary camera module and a teleconverter work together according to Embodiment 1 of this disclosure.

FIG. 5 is a schematic diagram of an optical path in which a switching module switches to a state in which a secondary camera module and a teleconverter work together. The optical path in the working state is that light first passes through the teleconverter 501, and then the optical path is changed by using a fixed reflection module 502. Afterwards, the optical path is changed again by using a reflection mirror 5031 of the switching module 503, and then light enters the secondary camera module 504. The switching module 503 switches to the state in which the secondary camera module and the teleconverter work together.

Figure 6:
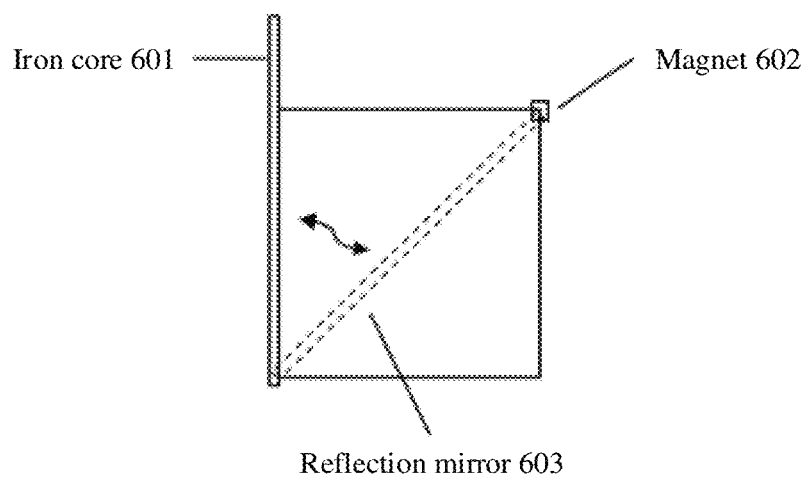
FIG. 6 is a schematic diagram of a structure of a magnetic switching reflection-mirror according to Embodiment 1 of this disclosure.

In a first possible implementation, the switching module is of a magnetic switching reflection-mirror structure. FIG. 6 is a schematic diagram of a structure of a magnetic switching reflection-mirror. A coil is wound on an iron core 601, and a magnet 602 is fastened at an upper end of a reflection mirror 603. When the coil is not energized, the magnet 602 and the iron core 601 attract each other, and the reflection mirror 603 is in a vertical state and does not overlap an optical path in which light directly enters the switching module. In this case, a light propagation direction is not affected, and the secondary camera module is in a state of working alone. When the coil is energized, the magnet 602 and the iron core 601 repel each other, the magnet drives the reflection mirror 603 to deflect to a slot location at a specific angle (for example, 45°) and stay, and the slot location overlaps an original optical path. Light enters a route through the teleconverter instead. A light propagation direction passing through the teleconverter is first deflected by one angle (for example, 90°) after the reflection module is passed through, and then deflected by another angle (for example, 90°) after the reflection mirror 603 of the switching module is passed through, to fold the optical path. In this case, the secondary camera module is in a state of working together with the teleconverter. It can be understood that a change in a magnetic logical relationship when the magnet is located at different locations falls within the protection scope of the present invention. None of the deflection angle of the reflection mirror 603, the deflection angle of the light, and the route are limited, and another light route corresponding to an optical path that can be folded also falls within the protection scope of this disclosure.

Figure 7:
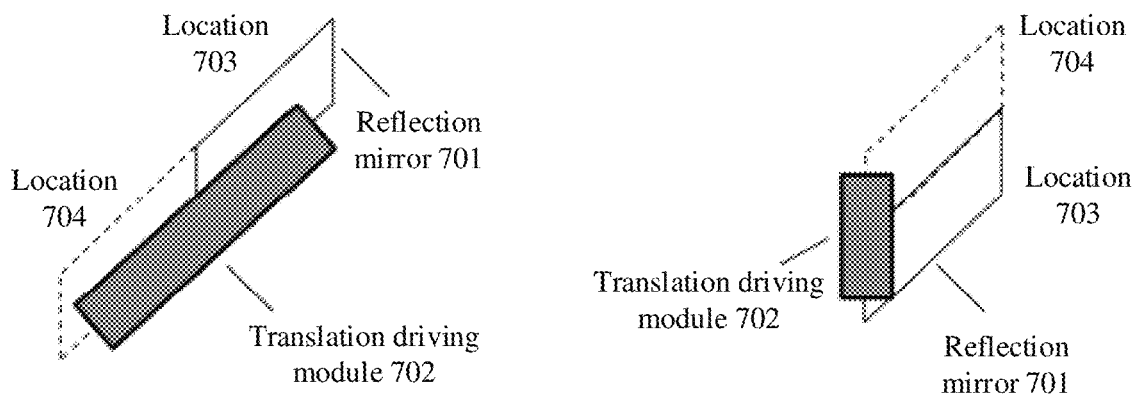
FIG. 7 is a schematic diagram of a structure of a translation reflection-mirror according to Embodiment 1 of this disclosure.

In a second possible implementation, the switching module is of a translation reflection-mirror structure. FIG. 7 is two schematic diagrams of structures of a translation reflection-mirror. A reflection mirror 701 that is of a translation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may be pushed to perform translation motion on the guide rail under the driving of a translation driving module 702. The translation driving module 702 may be a motor or any other component that can provide kinetic energy. When the reflection mirror is at a location 703 that does not overlap the original optical path, the optical path may directly pass through, and the secondary camera is in a state of working alone. When the reflection mirror is translated by the translation driving module 702 and is at a location 704 that completely overlaps the original optical path, the optical path can be folded by using the switching module, and the secondary camera is in a state of working together with the teleconverter.

Figure 8:
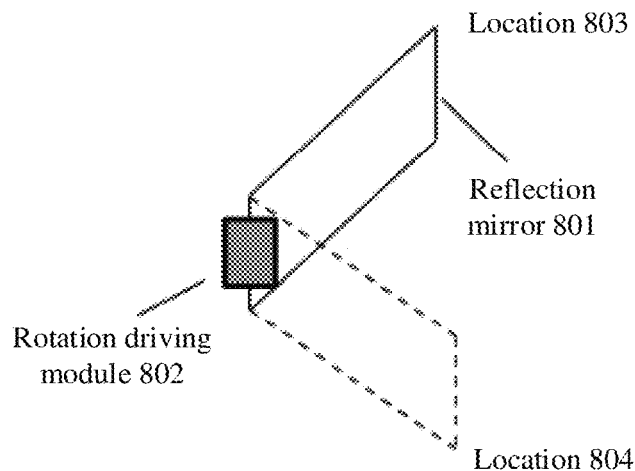
FIG. 8 is a schematic diagram of a structure of a rotation reflection-mirror according to Embodiment 1 of this disclosure.

In a third possible implementation, the switching module is of a rotation reflection-mirror structure. FIG. 8 is a schematic diagram of a structure of a rotation reflection-mirror. A reflection mirror 801 that is of a rotation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may rotate around a rotating shaft under the driving of a rotation driving module 802. The rotation driving module 802 may be a motor or any other component that can provide kinetic energy. When the reflection mirror is at a location 803 that does not overlap the original optical path, the optical path may directly pass through, and the secondary camera is in a state of working alone. When the reflection mirror is driven by the rotation driving module 802 to rotate and is at a location 804 that completely overlaps the original optical path, the optical path can be folded by using the switching module, and the secondary camera is in a state of working together with the teleconverter.

Figure 9:
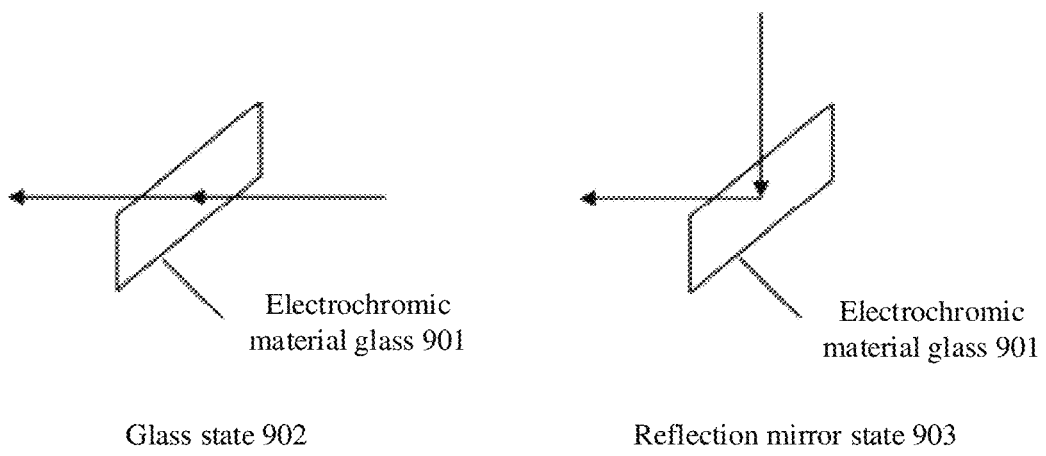
FIG. 9 is a schematic diagram of a structure of electrochromic material glass according to Embodiment 1 of this disclosure.

In a fourth possible implementation, the switching module is of an electrochromic material glass structure. FIG. 9 is a schematic diagram of a structure of electrochromic material glass. The electrochromic material glass 901 is integrated with a nanoparticle film in the glass. The nanoparticle film can be activated after the material is energized, so that the nanoparticle film is aggregated to form a reflection mirror. When a different voltage is switched to (for example, upon de-energization), the nanoparticle film can be removed and the reflection mirror becomes transparent glass. The electrochromic material glass 901 is placed in an optical path at a specific angle (for example, 45 degrees) from an original optical path. The material is transparent and is equivalent to a glass state 902 in a de-energized state, the optical path may directly pass through, and the secondary camera is in a state of working alone. The material can implement a total reflection function and is equivalent to a reflection mirror state 903 in an energized state, the optical path can be folded by using the switching module, and the secondary camera is in a state of working together with the teleconverter.

The control module 302 is configured to control, based on different object states, the switching module 301 to switch between the two working states, that is, the state in which the secondary camera module works alone and the state in which the secondary camera module and the teleconverter work together. In a possible implementation, the control module 302 performs object detection based on image data collected by a primary camera module, and records characteristics such as a number of an object, pixel location coordinates of the object in an image, and a size of the object. Based on a location of a specific object m in a field of view of a lens of the primary camera module and an image mapping relationship between the primary camera module and at least one secondary camera module that is calibrated in advance, it is determined that the object appears in a field of view of a lens of an $n^{th}$ secondary camera module. The object is obtained from an image captured by the $n^{th}$ secondary camera module, and whether a size of the object can satisfy a preset threshold size used for object recognition is detected. For example, a pixel value of a human face is 30. If the size of the object satisfies the preset threshold size, the teleconverter does not need to be controlled. If the size of the object does not satisfy the preset threshold size, the teleconverter is started to obtain a larger zoom image, and then detection is performed. Optionally, whether definition of the object can satisfy preset definition used for object recognition may further be confirmed. If the definition of the object satisfies the preset definition, the teleconverter does not need to be controlled. If the definition of the object does not satisfy the preset definition, the teleconverter is started to obtain an image with a larger zoom and higher definition, and then detection is performed. If the teleconverter needs to be started, the control module controls the coil on the iron core 601 to be energized. Optionally, the control module may further control the translation driving module 702 to translate the reflection mirror to overlap the original optical path, or control the rotation driving module 802 to rotate the reflection mirror to overlap the original optical path, or control the electrochromic material glass 901 to be energized. If the teleconverter does not need to be started, the control module controls the coil on the iron core 601 not to be energized. Optionally, the control module may further control the translation driving module 702 to translate the reflection mirror not to overlap the original optical path, or control the rotation driving module 802 to rotate the reflection mirror not to overlap the original optical path, or control the electrochromic material glass 901 not to be energized.

It can be understood that the two different working states of the switching module 301 are corresponding to two different selected optical paths. The state in which the secondary camera module works alone is corresponding to the optical path in which the light directly enters the secondary camera module, and the state in which the secondary camera module and the teleconverter work together is corresponding to the optical path in which the light enters from the teleconverter, and enters the secondary camera module after being reflected by the reflection module of the switching module. Optical path selection is based on different control signals provided by the control module 302.

Optionally, the control module may further control at least one switching module based on different requirements, for example, different object quantities. In a possible implementation, when surveillance needs to be performed on one object, the control module controls only one switching module, and a teleconverter, a secondary camera module, a secondary camera image sensor, a primary camera module, and a primary camera image sensor that are corresponding to the switching module to work together.

Optionally, the optical path foldable apparatus may further include a teleconverter, and the teleconverter is integrated with the switching module.

Optionally, the optical path foldable apparatus may further include a camera lens, and the camera lens is integrated with the switching module.

Optionally, the optical path foldable apparatus may further include a teleconverter and a camera lens, and both the teleconverter and the camera lens are integrated with the switching module.

The optical path foldable apparatus in Embodiment 1 of this disclosure may also be applied to a dome-shaped camera. When the optical path foldable apparatus in Embodiment 1 of this disclosure is applied to a dome-shaped camera, the secondary camera module is replaced with a camera module.

For the optical path foldable apparatus in Embodiment 1 of this disclosure, different optical paths may be selected based on different locations of an object, and switching between different focal length ranges is implemented without increasing a quantity of image sensors, that is, without obviously increasing costs, thereby expanding a photographing range of the camera.

Figure 10:
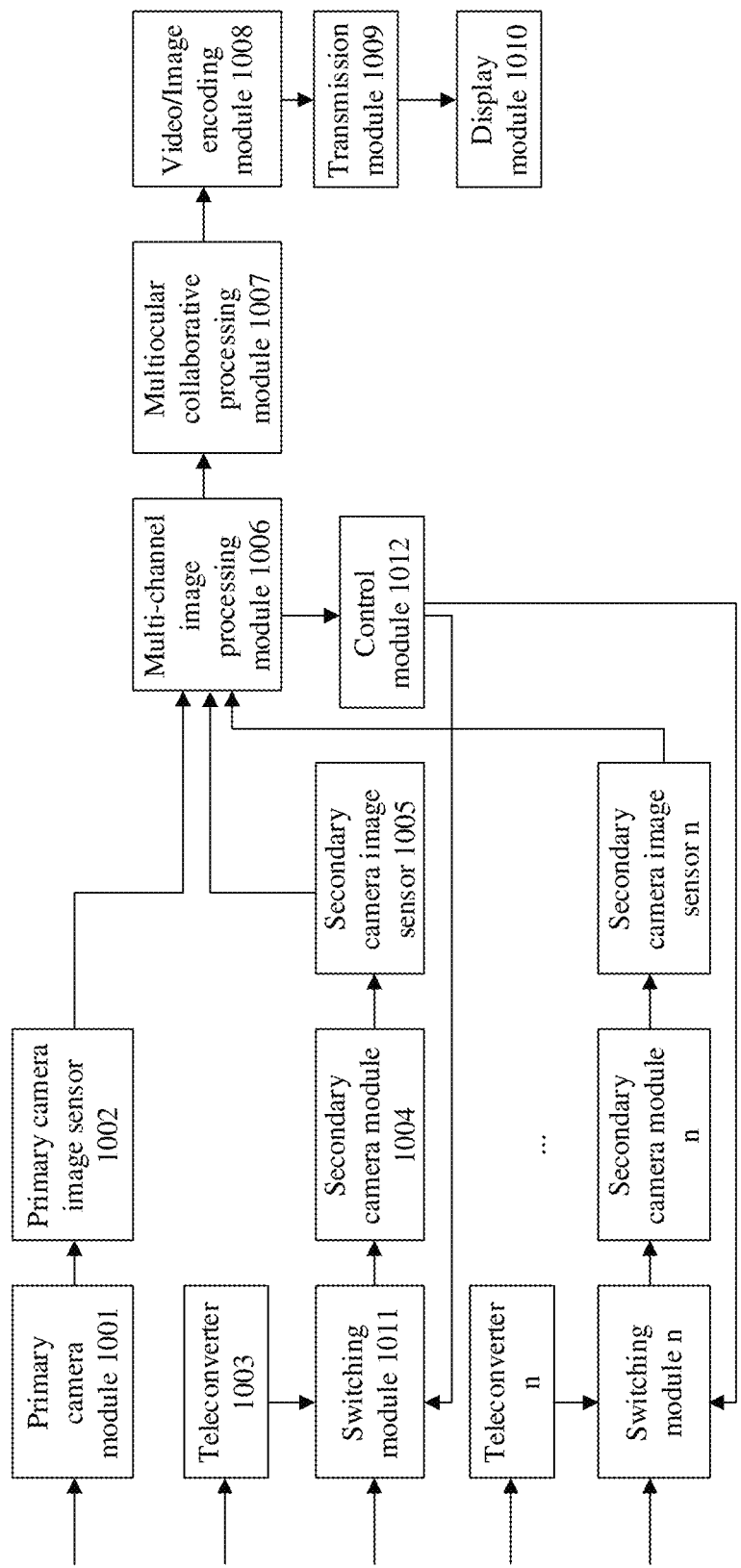
FIG. 10 is a schematic diagram of an optical path foldable multiocular camera according to Embodiment 2 of this disclosure.

Embodiment 2 of this disclosure provides an optical path foldable multiocular camera. An optical path foldable apparatus in the optical path foldable multiocular camera switches between different working states when photographing an object from different distances, to expand a photographing range of the multiocular camera. As shown in FIG. 10, the optical path foldable multiocular camera provided in Embodiment 2 of this disclosure includes: a primary camera module 1001, a primary camera image sensor 1002, a teleconverter 1003, a secondary camera module 1004, a secondary camera image sensor 1005, a multi-channel image processing module 1006, a multiocular collaborative processing module 1007, a video/image encoding module 1008, a transmission module 1009, a display module 1010, and the optical path foldable apparatus including a switching module 1011 and a control module 1012.

It should be noted that there may be N secondary camera modules based on an imaging requirement, and correspondingly there may also be N teleconverters, switching modules, and secondary camera image sensors. In one embodiment, the secondary camera module 1004, and the corresponding teleconverter 1003, switching module 1010, and secondary camera image sensor 1005 are provided.

Functions of the modules are described as follows:

The primary camera module 1001 is configured to image object light on the primary camera image sensor, and includes a lens and a light filter. The lens usually uses a wide-angle lens with a large field of view, to implement large-range surveillance. In a possible implementation, any value ranging from 4 mm to 10 mm may be selected for a focal length of the lens, and the lens may be a fixed-focus lens or a zoom lens. This is not limited herein. The light filter is configured to filter out interference light. In a possible implementation, the light filter may be an infrared cut-off filter, and can prevent light of another wavelength in an environment other than visible light from entering the system and affecting an imaging effect.

The primary camera image sensor 1002 is configured to capture an object image in real time by converting an optical signal into an electrical signal, and the image sensor includes a charge-coupled device (CCD) sensor, a complementary metal-oxide-semiconductor (CMOS) sensor, or a graphene material sensor.

The teleconverter 1003 is an optical module configured to multiply a zoom ratio of a lens. The teleconverter 1003 has a fixed zoom function, for example, a 2× teleconverter, and can be connected to a common zoom lens to double a focal length.

The secondary camera module 1004 is configured to image object light on the secondary camera image sensor, and includes a lens and a light filter. The lens usually uses a long-distance long-focus lens, to implement long-distance surveillance. The lens may be a fixed-focus lens or a zoom lens. This is not limited herein. The light filter is configured to filter out interference light. In a possible implementation, the light filter may be an infrared cut-off filter, and can prevent light of another wavelength in an environment other than visible light from entering the system and affecting an imaging effect. In a possible implementation, a focal length used by any secondary camera module to capture the object image needs to be greater than a focal length used by the primary camera lens to capture the object image, to clearly obtain an image corresponding to a far area. In another possible implementation, a field of view of the lens of the primary camera module is greater than a field of view of the lens of the any secondary camera module.

The secondary camera image sensor 1005 is configured to capture the object image in real time by converting an optical signal into an electrical signal, and the image sensor includes a charge-coupled device (CCD) sensor, a complementary metal-oxide-semiconductor (CMOS) sensor, or a graphene material sensor.

The multi-channel image processing module 1006 is configured to: receive image data collected by the primary camera image sensor and/or at least one secondary camera image sensor, and perform image processing on the collected image data. The image processing includes image processing operations such as demosaicing, automatic exposure, automatic white balance, auto-focus, color correction, sharpening enhancement, and noise reduction performed on the image data. Demosaicing means processing a Bayer image to obtain an RGB image, and is a process of interpolating pixels with uneven luminance obtained by the image sensor into smooth pixels. Automatic exposure means automatic adjustment of an exposure time and a gain of the image sensor based on luminance statistical information fed back during the image processing, to adjust luminance of an image. Automatic white balance means automatic adjustment of an RGB gain of the image processing module based on white zone statistical information to achieve color balance. Auto-focus means collecting statistics on image content and adjusting hardware actions of the primary camera module or secondary camera module based on a statistical result. Color correction means correction performed on a color restoration degree of the RGB image obtained after white balance processing. For example, the RGB image is multiplied by a color correction matrix to achieve color restoration. This is because there is a specific deviation between a spectrum obtained by the image sensor and a spectrum perceived by human eyes. In this case, color restoration correction needs to be performed to present a normal image that approximates to perception of human eyes. Sharpening enhancement means processing performed on edge enhancement and high-frequency detail enhancement on an image to make the image clearer. Noise reduction means suppression operations performed on interference noise of an image, including spatial noise reduction, temporal noise reduction, color noise suppression, or the like. Optionally, the module may further include a storage unit configured to store process image data or process video data that is present in a processing process.

The multiocular collaborative processing module 1007 is configured to: collaboratively process image data or video data shot by the primary camera module and at least one secondary camera module, that is, collaboratively process multiocular image data or video data, and preferably select optimal image data or optimal video data that includes a target object. In a possible implementation, detection of the target object are/is performed based on large field-of-view image data stored by the primary camera image sensor, and an ID and/or pixel location coordinates of the target object are/is recorded, to form a move route of the target object. The target object includes an important surveillance object such as a motor vehicle, a pedestrian, or a human face. Optionally, images including the detected object may further be selected and cropped. Then, correlation matching is performed based on information such as a calibrated image mapping relationship corresponding to space between the primary camera module and each secondary camera module and/or time dimension information (for example, a recorded time point) and spatial dimension information (for example, location coordinates) in the system. In a possible implementation, during spatial assembly, a spatial mapping relationship between a coverage area of the primary camera module and a coverage area of each secondary camera module is established based on a location relationship between the primary camera module and each secondary camera module. For example, the mapping relationship is expressed by using a location transformation matrix. A quality assessment method is used to obtain an optimal image among the plurality of obtained images including the target object. The quality assessment method means assessing, based on indicators such as a size, a posture, and/or definition of the target object, the plurality of images that include a same target object and that are captured by the primary camera module and the secondary camera module, to preferably select an optimal image. The quality assessment method may be a deep learning-based quality assessment method or another prior-art quality assessment method that can achieve optimal image selection.

The video/image encoding module 1008 is configured to perform image encoding or video encoding on image data or video data obtained after image processing, or perform image encoding or video encoding on image data or video data that is obtained after image processing and that is collected by the at least one secondary camera module. In addition, the video/image encoding module 1008 may further perform image encoding or video encoding on the optimal image data or the optimal video data that includes the target object and that is preferably selected by the multiocular collaborative processing module 1007, or perform image encoding or video encoding on an original image or an original video of the preferably selected optimal image data or the preferably selected optimal video data that includes the target object. A video/image encoding method may be an existing video/image encoding method. This is not limited in this disclosure.

The transmission module 1009 is configured to transmit encoded image data or video data. A data transmission method may be an existing data transmission method. This is not limited in this disclosure.

The display module 1010 is configured to decode the transmitted encoded video data or image data and display decoded video data or image data. For example, a video is displayed in a main display area on a video website display interface, and some captured images of an object, especially a preferably selected optimal image of the object, may be displayed in a peripheral display area of the main display area.

The switching module 1011 is configured to switch a location or a status of a reflection module, to switch between two working states, that is, a state in which the secondary camera module works alone and a state in which the secondary camera module and the teleconverter work together. The reflection module includes a reflection mirror or a prism.

Specifically, FIG. 4 is a schematic diagram of an optical path in which a switching module switches to a state in which a secondary camera module works alone. The optical path in the working state is that light is directly incident on the secondary camera module 402 through the switching module 401 without passing through a reflection mirror 4011. The switching module 401 switches to the state in which the secondary camera module works alone.

FIG. 5 is a schematic diagram of an optical path in which a switching module switches to a state in which a secondary camera module and a teleconverter work together. The optical path in the working state is that light first passes through the teleconverter 501, and then the optical path is changed by using a fixed reflection module 502. Afterwards, the optical path is changed again by using a reflection mirror 5031 of the switching module 503, and then light enters the secondary camera module 504. The switching module 503 switches to the state in which the secondary camera module and the teleconverter work together.

In a first possible implementation, the switching module is of a magnetic switching reflection-mirror structure. FIG. 6 is a schematic diagram of a structure of a magnetic switching reflection-mirror. A coil is wound on an iron core 601, and a magnet 602 is fastened at an upper end of a reflection mirror 603. When the coil is not energized, the magnet 602 and the iron core 601 attract each other, and the reflection mirror 603 is in a vertical state and does not overlap an optical path in which light directly enters the switching module. In this case, a light propagation direction is not affected, and the secondary camera module is in a state of working alone. When the coil is energized, the magnet 602 and the iron core 601 repel each other, the magnet drives the reflection mirror 603 to deflect to a slot location at a specific angle (for example, 45°) and stay, and the slot location overlaps an original optical path. Light enters a route through the teleconverter instead. A light propagation direction passing through the teleconverter is first deflected by one angle (for example, 90°) after the reflection module is passed through, and then deflected by another angle (for example, 90°) after the reflection mirror 603 of the switching module is passed through, to fold the optical path. In this case, the secondary camera module is in a state of working together with the teleconverter. It can be understood that a change in a magnetic logical relationship when the magnet is located at different locations falls within the protection scope of the present invention. None of the deflection angle of the reflection mirror 603, the deflection angle of the light, and the route are limited, and another light route corresponding to an optical path that can be folded also falls within the protection scope of this disclosure.

In a second possible implementation, the switching module is of a translation reflection-mirror structure. FIG. 7 is two schematic diagrams of structures of a translation reflection-mirror. A reflection mirror 701 that is of a translation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may be pushed to perform translation motion on the guide rail under the driving of a translation driving module 702. The translation driving module 702 may be a motor or any other component that can provide kinetic energy. When the reflection mirror is at a location 703 that does not overlap the original optical path, the optical path may directly pass through, and the secondary camera is in a state of working alone. When the reflection mirror is translated by the translation driving module 702 and is at a location 704 that completely overlaps the original optical path, the optical path can be folded by using the switching module, and the secondary camera is in a state of working together with the teleconverter.

In a third possible implementation, the switching module is of a rotation reflection-mirror structure. FIG. 8 is a schematic diagram of a structure of a rotation reflection-mirror. A reflection mirror 801 that is of a rotation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may rotate around a rotating shaft under the driving of a rotation driving module 802. The rotation driving module 802 may be a motor or any other component that can provide kinetic energy. When the reflection mirror is at a location 803 that does not overlap the original optical path, the optical path may directly pass through, and the secondary camera is in a state of working alone. When the reflection mirror is driven by the rotation driving module 802 to rotate and is at a location 804 that completely overlaps the original optical path, the optical path can be folded by using the switching module, and the secondary camera is in a state of working together with the teleconverter.

In a fourth possible implementation, the switching module is of an electrochromic material glass structure. FIG. 9 is a schematic diagram of a structure of electrochromic material glass. The electrochromic material glass 901 is integrated with a nanoparticle film in the glass. The nanoparticle film can be activated after the material is energized, so that the nanoparticle film is aggregated to form a reflection mirror. When a different voltage is switched to (for example, upon de-energization), the nanoparticle film can be removed and the reflection mirror becomes transparent glass. The electrochromic material glass 901 is placed in an optical path at a specific angle (for example, 45 degrees) from an original optical path. The material is transparent and is equivalent to a glass state 902 in a de-energized state, the optical path may directly pass through, and the secondary camera is in a state of working alone. The material can implement a total reflection function and is equivalent to a reflection mirror state 903 in an energized state, the optical path can be folded by using the switching module, and the secondary camera is in a state of working together with the teleconverter.

The control module 1012 is configured to control, based on different object states, the switching module 1011 to switch between the two working states, that is, the state in which the secondary camera module works alone and the state in which the secondary camera module and the teleconverter work together. The control module 1012 performs object detection based on image data collected by the primary camera module, and records characteristics such as a number of an object, pixel location coordinates of the object in an image, and a size of the object. Based on a location of a specific object m in a field of view of the lens of the primary camera module and an image mapping relationship between the primary camera module and at least one secondary camera module that is calibrated in advance, it is determined that the object appears in a field of view of a lens of an $n^{th}$ secondary camera module. The object is obtained from an image captured by the $n^{th}$ secondary camera module, and whether a size of the object can satisfy a preset threshold size used for object recognition is detected. For example, a pixel value of a human face is 30. If the size of the object satisfies the preset threshold size, the teleconverter does not need to be controlled. If the size of the object does not satisfy the preset threshold size, the teleconverter is started to obtain a larger zoom image, and then detection is performed. Optionally, whether definition of the object can satisfy preset definition used for object recognition may further be confirmed. If the definition of the object satisfies the preset definition, the teleconverter does not need to be controlled. If the definition of the object does not satisfy the preset definition, the teleconverter is started to obtain an image with a larger zoom and higher definition, and then detection is performed. If the teleconverter needs to be started, the control module controls the coil on the iron core 601 to be energized. Optionally, the control module may further control the translation driving module 702 to translate the reflection mirror to overlap the original optical path, or control the rotation driving module 802 to rotate the reflection mirror to overlap the original optical path, or control the electrochromic material glass 901 to be energized. If the teleconverter does not need to be started, the control module controls the coil on the iron core 601 not to be energized. Optionally, the control module may further control the translation driving module 702 to translate the reflection mirror not to overlap the original optical path, or control the rotation driving module 802 to rotate the reflection mirror not to overlap the original optical path, or control the electrochromic material glass 901 not to be energized.

It can be understood that the two different working states of the switching module 1011 are corresponding to two different selected optical paths. The state in which the secondary camera module works alone is corresponding to the optical path in which the light directly enters the secondary camera module, and the state in which the secondary camera module and the teleconverter work together is corresponding to the optical path in which the light enters from the teleconverter, and enters the secondary camera module after being reflected by the reflection module of the switching module. Optical path selection is based on different control signals provided by the control module 1012.

Optionally, the control module may further control at least one switching module based on different requirements, for example, different object quantities. In a possible implementation, when surveillance needs to be performed on one object, the control module controls only one switching module, and a teleconverter, a secondary camera module, a secondary camera image sensor, a primary camera module, and a primary camera image sensor that are corresponding to the switching module to work together.

For the optical path foldable multiocular camera in Embodiment 2 of this disclosure, different optical paths may be selected based on different locations of an object, and switching between different focal length ranges is implemented without increasing a quantity of image sensors, that is, without obviously increasing costs, thereby expanding a photographing range of the multiocular camera.

Figure 11:
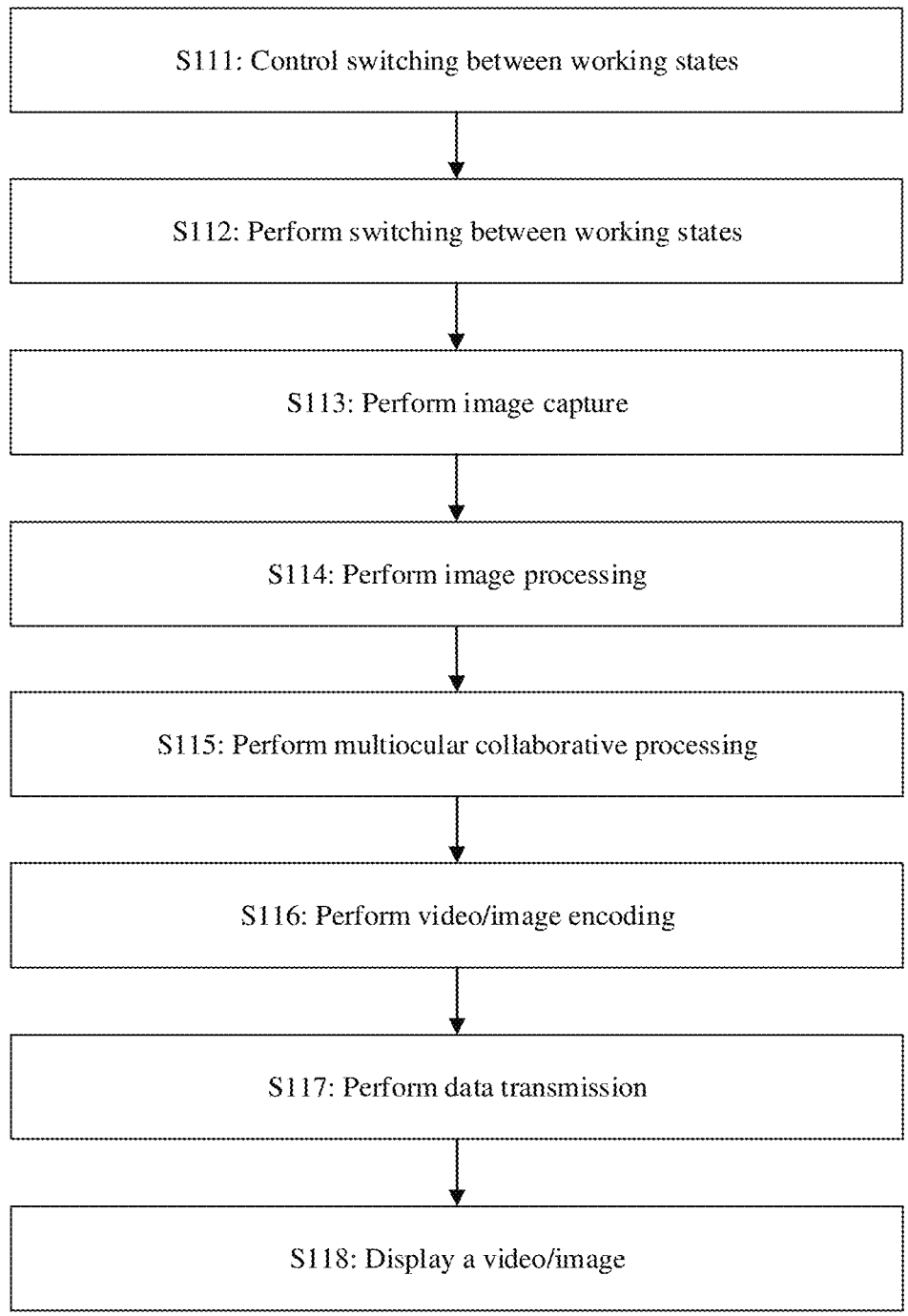
FIG. 11 is a flowchart of an optical path foldable method according to Embodiment 3 of this disclosure.

Embodiment 3 of this disclosure provides an optical path foldable method. FIG. 11 is a flowchart of the optical path foldable method. The optical path foldable method is applied to a multiocular camera, and specific implementation steps are as follows.

S111: Control switching between working states.

A control module controls, based on different object states, a switching module to switch between two working states, that is, a state in which a secondary camera module works alone and a state in which the secondary camera module and a teleconverter work together.

The control module performs object detection based on image data collected by a primary camera module, and records characteristics such as a number of an object, pixel location coordinates of the object in an image, and a size of the object. Based on a location of a specific object m in a field of view of a lens of the primary camera module and an image mapping relationship between the primary camera module and at least one secondary camera module that is calibrated in advance, it is determined that the object appears in a field of view of a lens of an $n^{th}$ secondary camera module. The object is obtained from an image captured by the $n^{th}$ secondary camera module, and whether a size of the object can satisfy a preset threshold size used for object recognition is detected. For example, a pixel value of a human face is 30. If the size of the object satisfies the preset threshold size, the teleconverter does not need to be controlled. If the size of the object does not satisfy the preset threshold size, the teleconverter is started to obtain a larger zoom image, and then detection is performed. Optionally, whether definition of the object can satisfy preset definition used for object recognition may further be confirmed. If the definition of the object satisfies the preset definition, the teleconverter does not need to be controlled. If the definition of the object does not satisfy the preset definition, the teleconverter is started to obtain an image with a larger zoom and higher definition, and then detection is performed. If the teleconverter needs to be started, in a possible implementation, a control method is: The control module controls the coil on the iron core 601 to be energized. Optionally, the control method may further be: The control module controls the translation driving module 702 to translate the reflection mirror to overlap an original optical path, or controls the rotation driving module 802 to rotate the reflection mirror to overlap an original optical path, or controls the electrochromic material glass 901 to be energized. If the teleconverter does not need to be started, the control module controls the coil on the iron core 601 not to be energized. Optionally, the control module may further control the translation driving module 702 to translate the reflection mirror not to overlap an original optical path, or control the rotation driving module 802 to rotate the reflection mirror not to overlap an original optical path, or control the electrochromic material glass 901 not to be energized.

It can be understood that the two different working states of the switching module are corresponding to two different selected optical paths. The state in which the secondary camera module works alone is corresponding to an optical path in which light directly enters the secondary camera module, and the state in which the secondary camera module and the teleconverter work together is corresponding to an optical path in which light enters from the teleconverter, and enters the secondary camera module after being reflected by a reflection module of the switching module. Optical path selection is based on different control signals provided by the control module, to control the switching module.

Optionally, the control module may further control at least one switching module based on different requirements, for example, different object quantities. In a possible implementation, when surveillance needs to be performed on one object, the control module controls only one switching module, and a teleconverter, a secondary camera module, a secondary camera image sensor, a primary camera module, and a primary camera image sensor that are corresponding to the switching module to work together.

S112: Perform switching between working states.

After receiving the control signal sent by the control module, the switching module switches a location or a status of the reflection module, to switch between the two working states, that is, the state in which the secondary camera module works alone and the state in which the secondary camera module and the teleconverter work together. The reflection module includes a reflection mirror or a prism.

Specifically, FIG. 4 is a schematic diagram of an optical path in which a switching module switches to a state in which a secondary camera module works alone. The optical path in the working state is that light is directly incident on the secondary camera module 402 through the switching module 401 without passing through a reflection mirror 4011. The switching module 401 switches to the state in which the secondary camera module works alone.

FIG. 5 is a schematic diagram of an optical path in which a switching module switches to a state in which a secondary camera module and a teleconverter work together. The optical path in the working state is that light first passes through the teleconverter 501, and then the optical path is changed by using a fixed reflection module 502. Afterwards, the optical path is changed again by using a reflection mirror 5031 of the switching module 503, and then light enters the secondary camera module 504. The switching module 503 switches to the state in which the secondary camera module and the teleconverter work together.

In a first possible implementation, a method for switching between working states is switching between working states by using a magnetic switching reflection-mirror. A coil is wound on an iron core 601, and a magnet 602 is fastened at an upper end of a reflection mirror 603. When the coil is not energized, the magnet 602 and the iron core 601 attract each other, and the reflection mirror 603 is in a vertical state and does not overlap an optical path in which light directly enters the switching module. In this case, a light propagation direction is not affected, and the secondary camera module is in a state of working alone. When the coil is energized, the magnet 602 and the iron core 601 repel each other, the magnet drives the reflection mirror 603 to deflect to a slot location at a specific angle (for example, 45°) and stay, and the slot location overlaps an original optical path. Light enters a route through the teleconverter instead. A light propagation direction passing through the teleconverter is first deflected by one angle (for example, 90°) after the reflection module is passed through, and then deflected by another angle (for example, 90°) after the reflection mirror 603 of the switching module is passed through, to fold the optical path. In this case, the secondary camera module is in a state of working together with the teleconverter. It can be understood that a change in a magnetic logical relationship when the magnet is located at different locations falls within the protection scope of the present invention. None of the deflection angle of the reflection mirror 603, the deflection angle of the light, and the route are limited, and another light route corresponding to an optical path that can be folded also falls within the protection scope of this disclosure.

In a second possible implementation, a method for switching between working states is switching between working states by using a translation reflection-mirror. FIG. 7 is two schematic diagrams of structures of a translation reflection-mirror. A reflection mirror 701 that is of a translation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may be pushed to perform translation motion on the guide rail under the driving of a translation driving module 702. The translation driving module 702 may be a motor or any other component that can provide kinetic energy. When the reflection mirror is at a location 703 that does not overlap the original optical path, the optical path may directly pass through, and the secondary camera is in a state of working alone. When the reflection mirror is translated by the translation driving module 702 and is at a location 704 that completely overlaps the original optical path, the optical path can be folded by using the switching module, and the secondary camera is in a state of working together with the teleconverter.

In a third possible implementation, a method for switching between working states is switching between working states by using a rotation reflection-mirror. FIG. 8 is a schematic diagram of a structure of a rotation reflection-mirror. A reflection mirror 801 that is of a rotation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may rotate around a rotating shaft under the driving of a rotation driving module 802. The rotation driving module 802 may be a motor or any other component that can provide kinetic energy. When the reflection mirror is at a location 803 that does not overlap the original optical path, the optical path may directly pass through, and the secondary camera is in a state of working alone. When the reflection mirror is driven by the rotation driving module 802 to rotate and is at a location 804 that completely overlaps the original optical path, the optical path can be folded by using the switching module, and the secondary camera is in a state of working together with the teleconverter.

In a fourth possible implementation, a method for switching between working states is switching between working states by energizing or de-energizing electrochromic material glass. FIG. 9 is a schematic diagram of a structure of electrochromic material glass. The electrochromic material glass 901 is integrated with a nanoparticle film in the glass. The nanoparticle film can be activated after the material is energized, so that the nanoparticle film is aggregated to form a reflection mirror. When a different voltage is switched to (for example, upon de-energization), the nanoparticle film can be removed and the reflection mirror becomes transparent glass. The electrochromic material glass 901 is placed in an optical path at a specific angle (for example, 45 degrees) from an original optical path. The material is transparent and is equivalent to a glass state 902 in a de-energized state, the optical path may directly pass through, and the secondary camera is in a state of working alone. The material can implement a total reflection function and is equivalent to a reflection mirror state 903 in an energized state, the optical path can be folded by using the switching module, and the secondary camera is in a state of working together with the teleconverter.

In a possible implementation, the method may further include:

S113: Perform image capture.

Based on different quantities of switching modules, teleconverters, secondary camera modules, and secondary camera image sensors that are controlled by the control module and that participate in image capture and different working states to which the switching modules switch, an image sensor of a secondary camera module corresponding to each switching module captures an object image in real time by converting an optical signal obtained by the corresponding secondary camera module into an electrical signal. Optionally, when only the primary camera module needs to participate in image capture, the primary camera image sensor captures the object image. The image sensor includes a charge-coupled device (CCD) sensor, a complementary metal-oxide-semiconductor (CMOS) sensor, or a graphene material sensor.

S114: Perform image processing.

Image processing is performed on the received image data collected by the primary camera image sensor and/or at least one secondary camera image sensor. The image processing includes image processing operations such as demosaicing, automatic exposure, automatic white balance, auto-focus, color correction, sharpening enhancement, and noise reduction performed on the image data. Demosaicing means processing a Bayer image to obtain an RGB image, and is a process of interpolating pixels with uneven luminance obtained by the image sensor into smooth pixels. Automatic exposure means automatic adjustment of an exposure time and a gain of the image sensor based on luminance statistical information fed back during the image processing, to adjust luminance of an image. Automatic white balance means automatic adjustment of an RGB gain of an image processing module based on white zone statistical information to achieve color balance. Auto-focus means collecting statistics on image content and adjusting hardware actions of the primary camera module or secondary camera module based on a statistical result. Color correction means correction performed on a color restoration degree of the RGB image obtained after white balance processing. For example, the RGB image is multiplied by a color correction matrix to achieve color restoration. This is because there is a specific deviation between a spectrum obtained by the image sensor and a spectrum perceived by human eyes. In this case, color restoration correction needs to be performed to present a normal image that approximates to perception of human eyes. Sharpening enhancement means processing performed on edge enhancement and high-frequency detail enhancement on an image to make the image clearer. Noise reduction means suppression operations performed on interference noise of an image, including spatial noise reduction, temporal noise reduction, color noise suppression, or the like. Optionally, the image processing may further include storage of image data or video data that is present in a processing process.

S115: Perform multiocular collaborative processing.

The images photographed by the primary camera module and the at least one secondary camera module are collaboratively processed, that is, multiocular images are collaboratively processed, and an optimal image that includes a target object is preferably selected. Detection of the target object are/is performed based on large field-of-view image data stored by the primary camera image sensor, and an ID and/or pixel location coordinates of the target object are/is recorded, to form a move route of the target object. The target object includes an important surveillance object such as a motor vehicle, a pedestrian, or a human face. Optionally, images including the detected object may further be selected and cropped. Then, correlation matching is performed based on information such as a calibrated image mapping relationship corresponding to space between the primary camera module and each secondary camera module and/or time dimension information (for example, a recorded time point) and spatial dimension information (for example, location coordinates) in the system. In a possible implementation, during spatial assembly, a spatial mapping relationship between a coverage area of the primary camera module and a coverage area of each secondary camera module is established based on a location relationship between the primary camera module and each secondary camera module. For example, the mapping relationship is expressed by using a location transformation matrix. A quality assessment algorithm is used to obtain an optimal image among the plurality of obtained images including the target object. The quality assessment algorithm means assessing, based on indicators such as a size, a posture, and/or definition of the target object, the plurality of images that include a same target object and that are captured by the primary camera module and the secondary camera module, to preferably select an optimal image. The quality assessment method may be a deep learning-based quality assessment method or another prior-art quality assessment method that can achieve optimal image selection.

S116: Perform video/image encoding.

Image encoding or video encoding is performed on image data or video data obtained after image processing, or image encoding or video encoding is performed on image data or video data that is obtained after image processing and that is collected by the at least one secondary camera module. In addition, image encoding or video encoding may further be performed on the optimal image data or the optimal video data that includes the target object and that is preferably selected by a multiocular collaborative processing module, or image encoding or video encoding may further be performed on an original image or an original video of the preferably selected optimal image data or the preferably selected optimal video data that includes the target object. A video/image encoding method may be an existing video/image encoding method. This is not limited in this disclosure.

S117: Perform data transmission.

Encoded image data or video data is transmitted. A data transmission method may be an existing data transmission method. This is not limited in this disclosure.

S118: Display the video/image.

The transmitted encoded video data or image data is decoded and decoded video data or image data is displayed. For example, a video is displayed in a main display area on a website display interface, and some captured images of an object, especially a preferably selected optimal image of the object, may be displayed in a peripheral display area of the main display area.

Figure 12:
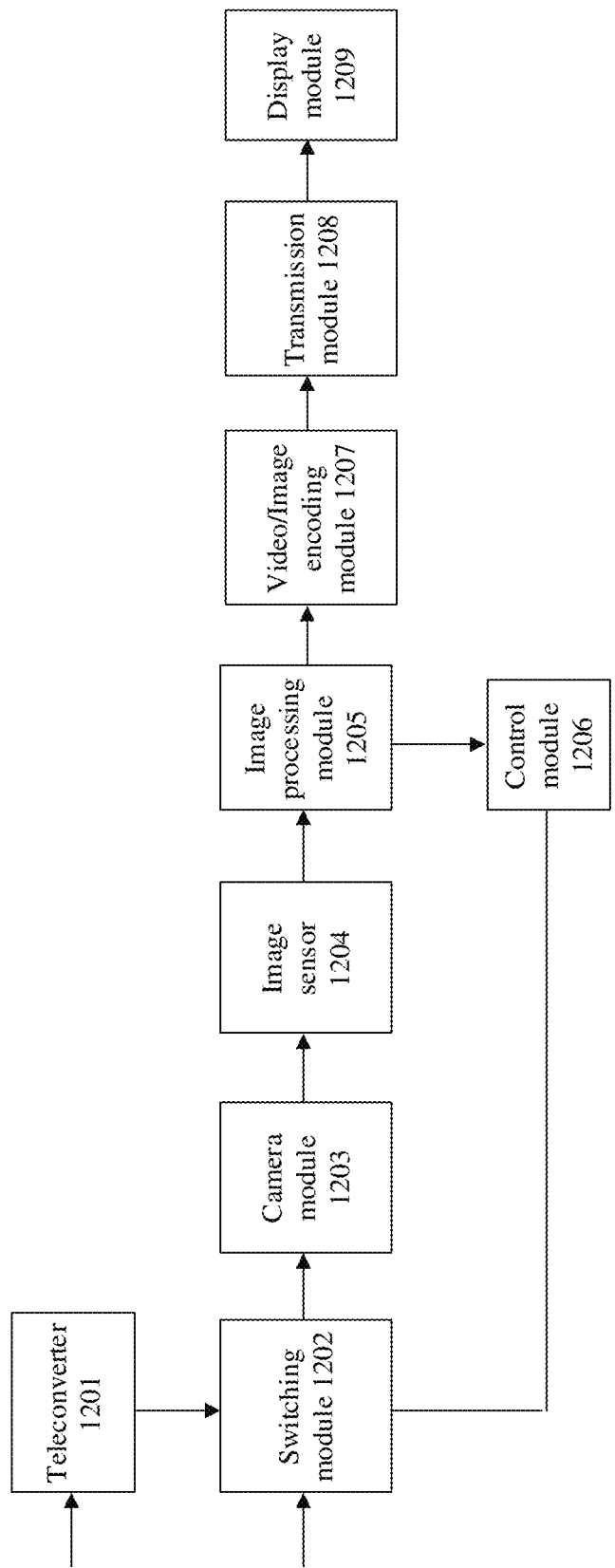
FIG. 12 is a schematic diagram of an optical path foldable dome-shaped camera according to Embodiment 4 of this disclosure.

Embodiment 4 of this disclosure provides an optical path foldable dome-shaped camera. An optical path foldable apparatus in the dome-shaped camera switches between different working states when photographing an object from different distances, to expand a photographing range of the dome-shaped camera. In addition, a length of the camera and a volume of the dome-shaped camera may further be reduced by using the optical path foldable apparatus. The optical path foldable dome-shaped camera is reduced in volume compared with other dome-shaped cameras having a same variable magnification. This facilitates installation and implementation. As shown in FIG. 12, the optical path foldable dome-shaped camera provided in Embodiment 4 of this disclosure includes: a teleconverter 1201, a switching module 1202, a camera module 1203, an image sensor 1204, an image processing module 1205, a control module 1206, a video/image encoding module 1207, a transmission module 1208, and a display module 1209, where the switching module 1202 and the control module 1206 constitute the optical path foldable apparatus.

It should be noted that there may be N camera modules based on an imaging requirement, and correspondingly there may also be N teleconverters, switching modules, and image sensors. In one embodiment, the camera module 1203, and the corresponding teleconverter 1201, switching module 1202, and image sensor 1204 are provided.

Functions of the modules are described as follows:

The teleconverter 1201 is an optical module configured to multiply a zoom ratio of a lens. The teleconverter 1201 has a fixed zoom function, for example, a 2× teleconverter, and can be connected to a common zoom lens to double a focal length. The teleconverter 1201 may include one or N teleconverters, and structures of the N teleconverters constitute an optical path multi-folding structure, that is, optical path folding occurs when light is transmitted between the N teleconverters. In a possible implementation, the optical path foldable dome-shaped camera may further include a fixed reflection module, where the fixed reflection module includes a reflection mirror, a prism, or another apparatus having a reflection function, and the fixed reflection module is configured to fold an optical path between the N teleconverters.

The switching module 1202 is configured to switch a location or a status of a reflection module, to switch between two working states, that is, a state in which the camera module works alone and a state in which the camera module and the teleconverter work together. The reflection module includes a reflection mirror or a prism.

Figure 13:
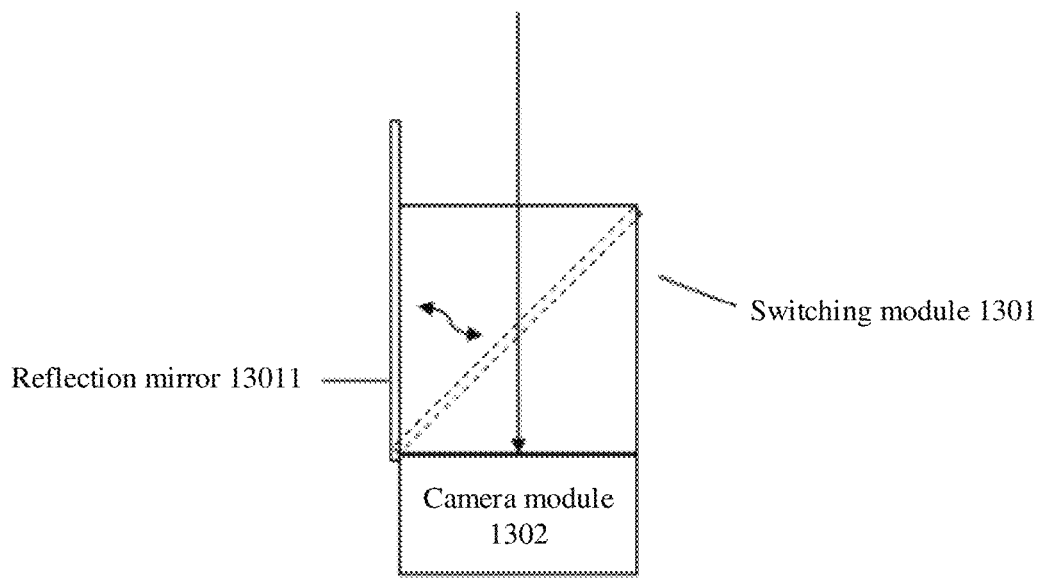
FIG. 13 is a schematic diagram of an optical path in a state in which a camera module works alone according to Embodiment 4 of this disclosure.

Specifically, FIG. 13 is a schematic diagram of an optical path in which a switching module switches to a state in which a camera module works alone. The optical path in the working state is that light is directly incident on the camera module 1302 through the switching module 1301 without passing through a reflection mirror 13011. The switching module 1301 switches to the state in which the camera module works alone.

Figure 14:
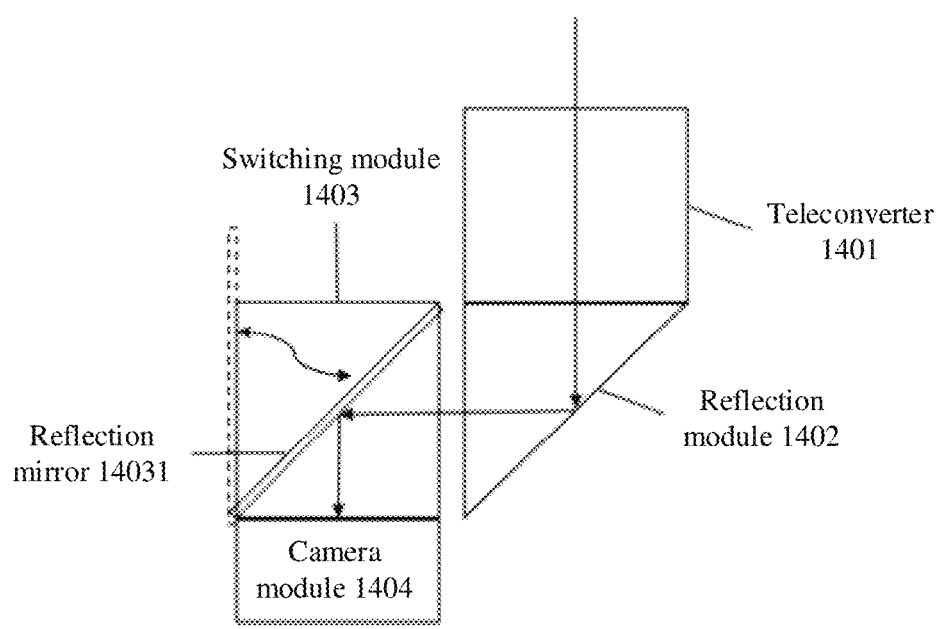
FIG. 14 is a schematic diagram of an optical path in a state in which a camera module and a teleconverter work together according to Embodiment 4 of this disclosure.

FIG. 14 is a schematic diagram of an optical path in which a switching module switches to a state in which a camera module and a teleconverter work together. The optical path in the working state is that light first passes through the teleconverter 1401, and then the optical path is changed by using a reflection module 1402. Afterwards, the optical path is changed again by using a reflection mirror 14031 of the switching module 1403, and then light enters the camera module 1404. The switching module 1403 switches to the state in which the camera module and the teleconverter work together.

In a first possible implementation, the switching module is of a magnetic switching reflection-mirror structure. FIG. 6 is a schematic diagram of a structure of a magnetic switching reflection-mirror. A coil is wound on an iron core 601, and a magnet 602 is fastened at an upper end of a reflection mirror 603. When the coil is not energized, the magnet 602 and the iron core 601 attract each other, and the reflection mirror 603 is in a vertical state and does not overlap an optical path in which light directly enters the switching module. In this case, a light propagation direction is not affected, and the camera module is in a state of working alone. When the coil is energized, the magnet 602 and the iron core 601 repel each other, the magnet drives the reflection mirror 603 to deflect to a slot location at a specific angle (for example, 45°) and stay, and the slot location overlaps an original optical path. Light enters a route through the teleconverter instead. A light propagation direction passing through the teleconverter is first deflected by one angle (for example, 90°) after the reflection module is passed through, and then deflected by another angle (for example, 90°) after the reflection mirror 603 of the switching module is passed through, to fold the optical path. In this case, the camera module is in a state of working together with the teleconverter. None of the deflection angle of the reflection mirror 603, the deflection angle of the light, and the route are limited, and another light route corresponding to an optical path that can be folded also falls within the protection scope of this disclosure.

In a second possible implementation, the switching module is of a translation reflection-mirror structure. FIG. 7 is two schematic diagrams of structures of a translation reflection-mirror. A reflection mirror 701 that is of a translation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may be pushed to perform translation motion on the guide rail under the driving of a translation driving module 702. The translation driving module 702 may be a motor or any other component that can provide kinetic energy. When the reflection mirror is at a location 703 that does not overlap the original optical path, the optical path may directly pass through, and the camera module is in a state of working alone. When the reflection mirror is translated by the translation driving module 702 and is at a location 704 that completely overlaps the original optical path, the optical path can be folded by using the switching module, and the camera module is in a state of working together with the teleconverter.

In a third possible implementation, the switching module is of a rotation reflection-mirror structure. FIG. 8 is a schematic diagram of a structure of a rotation reflection-mirror. A reflection mirror 801 that is of a rotation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may rotate around a rotating shaft under the driving of a rotation driving module 802. The rotation driving module 802 may be a motor or any other component that can provide kinetic energy. When the reflection mirror is at a location 803 that does not overlap the original optical path, the optical path may directly pass through, and the camera module is in a state of working alone. When the reflection mirror is driven by the rotation driving module 802 to rotate and is at a location 804 that completely overlaps the original optical path, the optical path can be folded by using the switching module, and the camera module is in a state of working together with the teleconverter.

In a fourth possible implementation, the switching module is of an electrochromic material glass structure. FIG. 9 is a schematic diagram of a structure of electrochromic material glass. The electrochromic material glass 901 is integrated with a nanoparticle film in the glass. The nanoparticle film can be activated after the material is energized, so that the nanoparticle film is aggregated to form a reflection mirror. When a different voltage is switched to (for example, upon de-energization), the nanoparticle film can be removed and the reflection mirror becomes transparent glass. The electrochromic material glass 901 is placed in an optical path at a specific angle (for example, 45 degrees) from an original optical path. The material is transparent and is equivalent to a glass state 902 in a de-energized state, the optical path may directly pass through, and the camera module is in a state of working alone. The material can implement a total reflection function and is equivalent to a reflection mirror state 903 in an energized state, the optical path can be folded by using the switching module, and the camera module is in a state of working together with the teleconverter.

The camera module 1203 is configured to image object light on the image sensor, and includes a lens and a light filter. The lens usually uses a zoom lens, for example, a 20× zoom lens whose zoom range is 4 mm to 150 mm. The light filter is configured to filter out interference light. In a possible implementation, the light filter may be an infrared cut-off filter, and can prevent light of another wavelength in an environment other than visible light from entering the system and affecting an imaging effect. In a possible implementation, the dome-shaped camera further includes a pan-tilt-zoom, the pan-tilt-zoom is connected to the camera module, and the pan-tilt-zoom enables the camera module to perform horizontal rotation or vertical rotation.

The image sensor 1204 is configured to capture an object image in real time by converting an optical signal into an electrical signal, and the image sensor includes a charge-coupled device (CCD) sensor, a complementary metal-oxide-semiconductor (CMOS) sensor, or a graphene material sensor.

The image processing module 1205 is configured to: receive image data collected by the image sensor, and perform image processing on the collected image data. The image processing includes image processing operations such as demosaicing, automatic exposure, automatic white balance, auto-focus, color correction, sharpening enhancement, and noise reduction performed on the image data. Demosaicing means processing a Bayer image to obtain an RGB image, and is a process of interpolating pixels with uneven luminance obtained by the image sensor into smooth pixels. Automatic exposure means automatic adjustment of an exposure time and a gain of the image sensor based on luminance statistical information fed back during the image processing, to adjust luminance of an image. Automatic white balance means automatic adjustment of an RGB gain of the image processing module based on white zone statistical information to achieve color balance. Auto-focus means collecting statistics on image content and adjusting hardware actions of the camera module based on a statistical result. Color correction means correction performed on a color restoration degree of the RGB image obtained after white balance processing. For example, the RGB image is multiplied by a color correction matrix to achieve color restoration. This is because there is a specific deviation between a spectrum obtained by the image sensor and a spectrum perceived by human eyes. In this case, color restoration correction needs to be performed to present a normal image that approximates to perception of human eyes. Sharpening enhancement means processing performed on edge enhancement and high-frequency detail enhancement on an image to make the image clearer. Noise reduction means suppression operations performed on interference noise of an image, including spatial noise reduction, temporal noise reduction, color noise suppression, or the like. Optionally, the module may further include a storage unit configured to store image data or video data that is present in a processing process.

The control module 1206 is configured to control, based on different object states, the switching module 1202 to switch between the two working states, that is, the state in which the camera module works alone and the state in which the camera module and the teleconverter work together. After a working mode is set, the control module 1206 may adjust PTZ parameters based on a size characteristic of an object in a field-of-view picture, to obtain an object image with a proper size. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T motions of the pan-tilt-zoom are controlled by two motors inside the dome-shaped camera, and Z is controlled by a zoom motor inside the dome-shaped camera. Optionally, the PTZ parameters may further be adjusted based on a type of the object, definition of the object, or another object characteristic. Within a working focal range of the lens of the camera module, the camera module searches for the object along with rotation of the pan-tilt-zoom based on a motion setting and an object characteristic setting of the dome-shaped camera, for example, cyclically moves along a circular route and captures a facial feature object. In a possible implementation, the switching module switches to the state in which the camera module and the teleconverter work together, based on a size of the object, for example, adjusting the Z parameter to increase the size of the object when the size is not large enough or adjusting the Z parameter to decrease the size of the object when the size is excessively large; and/or based on a type characteristic of the object; and/or based on a distance between the object and the camera module, for example, when it is detected that the distance between the object and the camera module is greater than the focal range of the camera module. A conversion manner may be implemented by using one or more mapping curves, or may be implemented by using a lookup table. The P and T parameters are used to implement horizontal rotation and vertical rotation of the pan-tilt-zoom of the dome-shaped camera by controlling motions of the corresponding motors, and the Z parameter indicates zoom control of the lens. Based on a value of the Z parameter, when the value of the Z parameter falls within a parameter value range corresponding to the focal range of the lens of the camera module, the switching module switches to the state in which the camera module works alone. When the value of the Z parameter does not fall within the parameter value range corresponding to the focal range of the camera module, the teleconverter is required to access an optical path to perform cooperation to reach the required working focal length range, and the switching module switches to the state in which the camera module and the teleconverter work together, to implement a magnification effect. After the control module controls, based on a status of the object, the motors inside the dome-shaped camera to adjust the PTZ parameters of the dome-shaped camera to PTZ values corresponding to an object location, the camera module starts to capture the object image. If the teleconverter needs to be started, the control module controls the coil on the iron core 601 to be energized. Optionally, the control module may further control the translation driving module 702 to translate the reflection mirror to overlap the original optical path, or control the rotation driving module 802 to rotate the reflection mirror to overlap the original optical path, or control the electrochromic material glass 901 to be energized. If the teleconverter does not need to be started, the control module controls the coil on the iron core 601 not to be energized. Optionally, the control module may further control the translation driving module 702 to translate the reflection mirror not to overlap the original optical path, or control the rotation driving module 802 to rotate the reflection mirror not to overlap the original optical path, or control the electrochromic material glass 901 not to be energized.

The working mode includes a manual mode, a preset location scanning mode, or an automatic mode, which are separately described below.

(1) Manual mode: Based on a location selected by a user in a surveillance field-of-view picture on a display module interface and by using the location as a center of the picture, PTZ parameters are calculated, which are required when the dome-shaped camera can clearly capture an object in the picture, that is, the object in the picture satisfies an object size, object type, or object definition requirement. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T parameters are used to implement horizontal rotation and vertical rotation of the pan-tilt-zoom of the dome-shaped camera by controlling motions of the corresponding motors, and the Z parameter indicates zoom control of the lens. Based on a value of the Z parameter, when the value of the Z parameter falls within a parameter value range corresponding to the focal range of the lens of the camera module, the switching module switches to the state in which the camera module works alone, and the Z parameter is controlled by the zoom motor inside the dome-shaped camera. When the value of the Z parameter does not fall within the parameter value range corresponding to the focal range of the camera module, the teleconverter is required to access an optical path to perform cooperation to reach the required working focal length range, and the switching module switches to the state in which the camera module and the teleconverter work together, to implement a magnification effect. In addition, the zoom motor inside the dome-shaped camera cooperatively controls the Z parameter. After the control module controls, based on a status of the object, the motors inside the dome-shaped camera to adjust the PTZ parameters of the dome-shaped camera to PTZ values corresponding to an object location, the camera module starts to capture the object image.

(2) Preset location scanning mode: Based on locations of the dome-shaped camera that are corresponding to several preset scanning areas and that are preset by a user, the dome-shaped camera moves to the preset locations one by one according to a specified sequence. After staying at a preset location for a fixed time, the dome-shaped camera moves to a next preset location. Each preset location is corresponding to a group of PTZ parameters. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T parameters are used to implement horizontal rotation and vertical rotation of the pan-tilt-zoom of the dome-shaped camera by controlling motions of the corresponding motors, and the Z parameter indicates zoom control of the lens. Based on a value of the Z parameter, when the value of the Z parameter falls within a parameter value range corresponding to the focal range of the lens of the camera module, the switching module switches to the state in which the camera module works alone, and the Z parameter is controlled by the zoom motor inside the dome-shaped camera. When the value of the Z parameter does not fall within the parameter value range corresponding to the focal range of the camera module, the teleconverter is required to access an optical path to perform cooperation to reach the required working focal length range, and the switching module switches to the state in which the camera module and the teleconverter work together, to implement a magnification effect. In addition, the zoom motor inside the dome-shaped camera cooperatively controls the Z parameter. After the control module controls, based on a status of an object, the motors inside the dome-shaped camera to adjust the PTZ parameters of the dome-shaped camera to PTZ values corresponding to an object location, the camera module starts to capture the object image.

(3) Automatic mode: Based on a status of an object in a field-of-view picture and an object searching algorithm preset for the dome-shaped camera, the dome-shaped camera automatically adjusts PTZ parameters with reference to an object location. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T parameters are used to implement horizontal rotation and vertical rotation of the pan-tilt-zoom of the dome-shaped camera by controlling motions of the corresponding motors, and the Z parameter indicates zoom control of the lens. Based on a value of the Z parameter, when the value of the Z parameter falls within a parameter value range corresponding to the focal range of the lens of the camera module, the switching module switches to the state in which the camera module works alone, and the Z parameter is controlled by the zoom motor inside the dome-shaped camera. When the value of the Z parameter does not fall within the parameter value range corresponding to the focal range of the camera module, the teleconverter is required to access an optical path to perform cooperation to reach the required working focal length range, and the switching module switches to the state in which the camera module and the teleconverter work together, to implement a magnification effect. In addition, the zoom motor inside the dome-shaped camera cooperatively controls the Z parameter. After the control module controls, based on the status of the object, the motors inside the dome-shaped camera to adjust the PTZ parameters of the dome-shaped camera to PTZ values corresponding to the object location, the camera module starts to capture the object image. It can be understood that the two different working states of the switching module 1202 are corresponding to two different selected optical paths. The state in which the camera module works alone is corresponding to the optical path in which the light directly enters the camera module, and the state in which the camera module and the teleconverter work together is corresponding to the optical path in which the light enters from the teleconverter, and enters the camera module after being reflected by the reflection module of the switching module. Optical path selection is based on different control signals provided by the control module 1012.

The video/image encoding module 1207 is configured to perform image encoding or video encoding on image data or video data obtained after image processing. A video/image encoding method may be an existing video/image encoding method. This is not limited in this disclosure.

The transmission module 1208 is configured to transmit encoded image data or video data. A data transmission method may be an existing data transmission method. This is not limited in this disclosure.

The display module 1209 is configured to decode the transmitted encoded video data or image data and display decoded video data or image data. For example, a video is displayed in a main display area on a video website display interface, and some captured images of an object may be displayed in a peripheral display area of the main display area. Optionally, the display module may further receive a user instruction input, where the instruction input includes selecting a working mode or selecting a picture location in a manual mode.

Optionally, the dome-shaped camera may further include one or more fixed reflection apparatuses, and the fixed reflection apparatus may be a reflection mirror, a prism, glass, or another apparatus having a reflection function. The fixed reflection apparatus is configured to fold an optical path to reduce a length of the dome-shaped camera.

Figure 15:
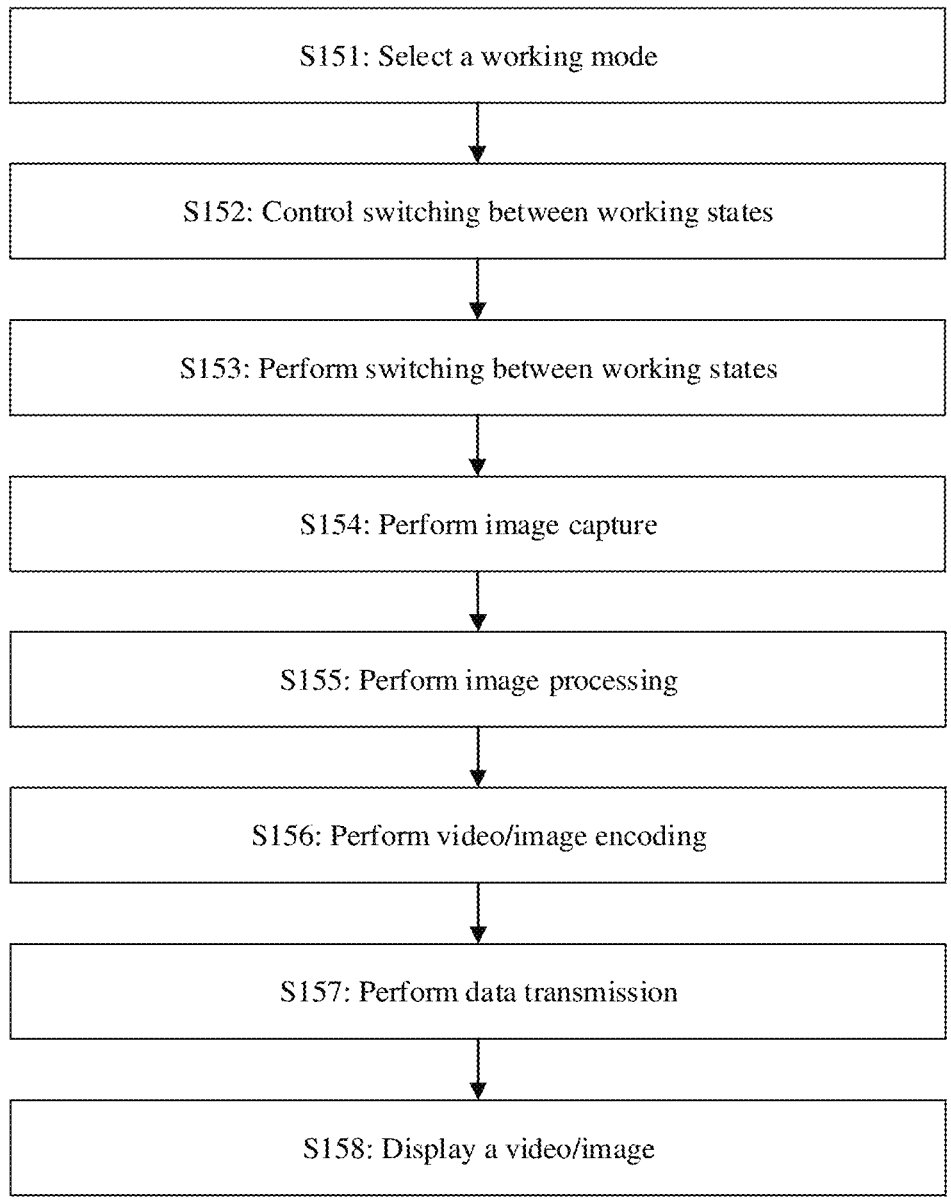
FIG. 15 is a flowchart of an optical path foldable method according to Embodiment 5 of this disclosure.

Embodiment 5 of this disclosure provides another optical path foldable method. FIG. 15 is a flowchart of the optical path foldable method. The optical path foldable method is applied to a dome-shaped camera, and specific implementation steps are as follows.

S151: Select a working mode.

A user selects the working mode. The working mode includes a manual mode, a preset location scanning mode, or an automatic mode, which are separately described.

(1) Manual mode: Based on a location selected by a user in a surveillance field-of-view picture on a display module interface and by using the location as a center of the picture, PTZ parameters are calculated, which are required when the dome-shaped camera can clearly capture an object in the picture, that is, the object in the picture satisfies an object size, object type, or object definition requirement. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T parameters are used to implement horizontal rotation and vertical rotation of the pan-tilt-zoom of the dome-shaped camera by controlling motions of corresponding motors, and the Z parameter indicates zoom control of the lens. Based on a value of the Z parameter, when the value of the Z parameter falls within a parameter value range corresponding to a focal range of a lens of a camera module, a switching module switches to a state in which the camera module works alone, and the Z parameter is controlled by a zoom motor inside the dome-shaped camera. When the value of the Z parameter does not fall within the parameter value range corresponding to the focal range of the camera module, a teleconverter is required to access an optical path to perform cooperation to reach the required working focal length range, and the switching module switches to a state in which the camera module and the teleconverter work together, to implement a magnification effect. In addition, the zoom motor inside the dome-shaped camera cooperatively controls the Z parameter. After a control module controls, based on a status of the object, the motors inside the dome-shaped camera to adjust the PTZ parameters of the dome-shaped camera to PTZ values corresponding to an object location, the camera module starts to capture an object image.

(2) Preset location scanning mode: Based on locations of the dome-shaped camera that are corresponding to several preset scanning areas and that are preset by a user, the dome-shaped camera moves to the preset locations one by one according to a specified sequence. After staying at a preset location for a fixed time, the dome-shaped camera moves to a next preset location. Each preset location is corresponding to a group of PTZ parameters. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T parameters are used to implement horizontal rotation and vertical rotation of the pan-tilt-zoom of the dome-shaped camera by controlling motions of corresponding motors, and the Z parameter indicates zoom control of the lens. Based on a value of the Z parameter, when the value of the Z parameter falls within a parameter value range corresponding to a focal range of a lens of a camera module, a switching module switches to a state in which the camera module works alone, and the Z parameter is controlled by a zoom motor inside the dome-shaped camera. When the value of the Z parameter does not fall within the parameter value range corresponding to the focal range of the camera module, a teleconverter is required to access an optical path to perform cooperation to reach the required working focal length range, and the switching module switches to a state in which the camera module and the teleconverter work together, to implement a magnification effect. In addition, the zoom motor inside the dome-shaped camera cooperatively controls the Z parameter. After a control module controls, based on a status of an object, the motors inside the dome-shaped camera to adjust the PTZ parameters of the dome-shaped camera to PTZ values corresponding to an object location, the camera module starts to capture an object image.

(3) Automatic mode: Based on a status of an object in a field-of-view picture and an object searching algorithm preset for the dome-shaped camera, the dome-shaped camera automatically adjusts PTZ parameters with reference to an object location. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T parameters are used to implement horizontal rotation and vertical rotation of the pan-tilt-zoom of the dome-shaped camera by controlling motions of corresponding motors, and the Z parameter indicates zoom control of the lens. Based on a value of the Z parameter, when the value of the Z parameter falls within a parameter value range corresponding to a focal range of a lens of a camera module, a switching module switches to a state in which the camera module works alone, and the Z parameter is controlled by a zoom motor inside the dome-shaped camera. When the value of the Z parameter does not fall within the parameter value range corresponding to the focal range of the camera module, a teleconverter is required to access an optical path to perform cooperation to reach the required working focal length range, and the switching module switches to a state in which the camera module and the teleconverter work together, to implement a magnification effect. In addition, the zoom motor inside the dome-shaped camera cooperatively controls the Z parameter. After a control module controls, based on the status of the object, the motors inside the dome-shaped camera to adjust the PTZ parameters of the dome-shaped camera to PTZ values corresponding to the object location, the camera module starts to capture an object image.

S152: Control switching between working states.

The control module controls, based on different object states, the switching module to switch between the two working states, that is, the state in which the camera module works alone and the state in which the camera module and the teleconverter work together. A reflection module includes a reflection mirror or a prism.

After the working mode is set, the control module may adjust PTZ parameters based on a size characteristic of an object in a field-of-view picture, to obtain an object image with a proper size. In security protection surveillance applications, PTZ in the PTZ parameters is short for pan/tilt/zoom. P indicates horizontal rotation of the pan-tilt-zoom, T indicates vertical rotation of the pan-tilt-zoom, and Z indicates zoom control of a lens. The P and T motions of the pan-tilt-zoom are controlled by two motors inside the dome-shaped camera, and Z is controlled by a zoom motor inside the dome-shaped camera. Optionally, the PTZ parameters may further be adjusted based on a type of the object, definition of the object, or another object characteristic. Within the working focal range of the lens of the camera module, the camera module searches for the object along with rotation of the pan-tilt-zoom based on a motion setting and an object characteristic setting of the dome-shaped camera, for example, cyclically moves along a circular route and captures a facial feature object. A conversion manner may be implemented by using one or more mapping curves, or may be implemented by using a lookup table. The P and T parameters are used to implement horizontal rotation and vertical rotation of the pan-tilt-zoom of the dome-shaped camera by controlling motions of the corresponding motors, and the Z parameter indicates zoom control of the lens. Based on a value of the Z parameter, when the value of the Z parameter falls within a parameter value range corresponding to the focal range of the lens of the camera module, the switching module switches to the state in which the camera module works alone, and the Z parameter is controlled by the zoom motor inside the dome-shaped camera. When the value of the Z parameter does not fall within the parameter value range corresponding to the focal range of the camera module, the teleconverter is required to access an optical path to perform cooperation to reach the required working focal length range, and the switching module switches to the state in which the camera module and the teleconverter work together, to implement a magnification effect. In addition, the zoom motor inside the dome-shaped camera cooperatively controls the Z parameter. After the control module controls, based on a status of the object, the motors inside the dome-shaped camera to adjust the PTZ parameters of the dome-shaped camera to PTZ values corresponding to an object location, the camera module starts to capture an object image. If the teleconverter needs to be started, the control module controls the coil on the iron core 601 to be energized. Optionally, the control module may further control the translation driving module 702 to translate the reflection mirror to overlap the original optical path, or control the rotation driving module 802 to rotate the reflection mirror to overlap the original optical path, or control the electrochromic material glass 901 to be energized. If the teleconverter does not need to be started, the control module controls the coil on the iron core 601 not to be energized. Optionally, the control module may further control the translation driving module 702 to translate the reflection mirror not to overlap the original optical path, or control the rotation driving module 802 to rotate the reflection mirror not to overlap the original optical path, or control the electrochromic material glass 901 not to be energized.

It can be understood that the two different working states of the switching module 1202 are corresponding to two different selected optical paths. The state in which the camera module works alone is corresponding to the optical path in which the light directly enters the camera module, and the state in which the camera module and the teleconverter work together is corresponding to the optical path in which the light enters from the teleconverter, and enters the camera module after being reflected by the reflection module of the switching module. Optical path selection is based on different control signals provided by the control module 1012.

S153: Perform switching between working states.

After receiving the control signal sent by the control module, the switching module switches a location or a status of the reflection mirror, to switch between the two working states, that is, the state in which the camera module works alone and the state in which the camera module and the teleconverter work together.

Specifically, FIG. 13 is a schematic diagram of an optical path in which a switching module switches to a state in which a camera module works alone. The optical path in the working state is that light is directly incident on the camera module 1302 through the switching module 1301 without passing through a reflection mirror 13011. The switching module 1301 switches to the state in which the camera module works alone.

FIG. 14 is a schematic diagram of an optical path in which a switching module switches to a state in which a camera module and a teleconverter work together. The optical path in the working state is that light first passes through the teleconverter 1401, and then the optical path is changed by using a reflection module 1402. Afterwards, the optical path is changed again by using a reflection mirror 14031 of the switching module 1403, and then light enters the camera module 1404. The switching module 1403 switches to the state in which the camera module and the teleconverter work together. In a possible implementation, the teleconverter 1401 may include one or N teleconverters, and structures of the N teleconverters constitute an optical path multi-folding structure, that is, optical path folding occurs when light is transmitted between the N teleconverters. In a possible implementation, the optical path foldable dome-shaped camera may further include a fixed reflection module, where the fixed reflection module includes a reflection mirror, a prism, or another apparatus having a reflection function, and the fixed reflection module is configured to fold an optical path between the N teleconverters.

In a first possible implementation, the switching module is of a magnetic switching reflection-mirror structure. FIG. 6 is a schematic diagram of a structure of a magnetic switching reflection-mirror. A coil is wound on an iron core 601, and a magnet 602 is fastened at an upper end of a reflection mirror 603. When the coil is not energized, the magnet 602 and the iron core 601 attract each other, and the reflection mirror 603 is in a vertical state and does not overlap an optical path in which light directly enters the switching module. In this case, a light propagation direction is not affected, and the camera module is in a state of working alone. When the coil is energized, the magnet 602 and the iron core 601 repel each other, the magnet drives the reflection mirror 603 to deflect to a slot location at a specific angle (for example, 45°) and stay, and the slot location overlaps an original optical path. Light enters a route through the teleconverter instead. A light propagation direction passing through the teleconverter is first deflected by one angle (for example, 90°) after the reflection module is passed through, and then deflected by another angle (for example, 90°) after the reflection mirror 603 of the switching module is passed through, to fold the optical path. In this case, the camera module is in a state of working together with the teleconverter. None of the deflection angle of the reflection mirror 603, the deflection angle of the light, and the route are limited, and another light route corresponding to an optical path that can be folded also falls within the protection scope of this disclosure.

In a second possible implementation, the switching module is of a translation reflection-mirror structure. FIG. 7 is two schematic diagrams of structures of a translation reflection-mirror. A reflection mirror 701 that is of a translation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may be pushed to perform translation motion on the guide rail under the driving of a translation driving module 702. The translation driving module 702 may be a motor or any other component that can provide kinetic energy. When the reflection mirror is at a location 703 that does not overlap the original optical path, the optical path may directly pass through, and the camera module is in a state of working alone. When the reflection mirror is translated by the translation driving module 702 and is at a location 704 that completely overlaps the original optical path, the optical path can be folded by using the switching module, and the camera module is in a state of working together with the teleconverter.

In a third possible implementation, the switching module is of a rotation reflection-mirror structure. FIG. 8 is a schematic diagram of a structure of a rotation reflection-mirror. A reflection mirror 801 that is of a rotation reflection-mirror structure is fastened in a frame. The reflection mirror may be a prism, a planar reflection mirror, or another component that can implement an optical path reflection function. The frame may be a frame made of any material.

The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may rotate around a rotating shaft under the driving of a rotation driving module 802. The rotation driving module 802 may be a motor or any other component that can provide kinetic energy. When the reflection mirror is at a location 803 that does not overlap the original optical path, the optical path may directly pass through, and the camera module is in a state of working alone. When the reflection mirror is driven by the rotation driving module 802 to rotate and is at a location 804 that completely overlaps the original optical path, the optical path can be folded by using the switching module, and the camera module is in a state of working together with the teleconverter.

In a fourth possible implementation, the switching module is of an electrochromic material glass structure. FIG. 9 is a schematic diagram of a structure of electrochromic material glass. The electrochromic material glass 901 is integrated with a nanoparticle film in the glass. The nanoparticle film can be activated after the material is energized, so that the nanoparticle film is aggregated to form a reflection mirror. When a different voltage is switched to (for example, upon de-energization), the nanoparticle film can be removed and the reflection mirror becomes transparent glass. The electrochromic material glass 901 is placed in an optical path at a specific angle (for example, 45 degrees) from an original optical path. The material is transparent and is equivalent to a glass state 902 in a de-energized state, the optical path may directly pass through, and the camera module is in a state of working alone. The material can implement a total reflection function and is equivalent to a reflection mirror state 903 in an energized state, the optical path can be folded by using the switching module, and the camera module is in a state of working together with the teleconverter.

In a possible implementation, the method may further include:

S154: Perform image capture.

Based on different working states to which the switching modules switch and that are controlled by the control module, an image sensor captures the object image in real time by converting an optical signal obtained by the camera module into an electrical signal. The image sensor includes a charge-coupled device (CCD) sensor, a complementary metal-oxide-semiconductor (CMOS) sensor, or a graphene material sensor.

S155: Perform image processing.

Image processing is performed on the received image data collected by the image sensor. The image processing includes image processing operations such as demosaicing, automatic exposure, automatic white balance, auto-focus, color correction, sharpening enhancement, and noise reduction performed on the image data. Demosaicing means processing a Bayer image to obtain an RGB image, and is a process of interpolating pixels with uneven luminance obtained by the image sensor into smooth pixels. Automatic exposure means automatic adjustment of an exposure time and a gain of the image sensor based on luminance statistical information fed back during the image processing, to adjust luminance of an image. Automatic white balance means automatic adjustment of an RGB gain of an image processing module based on white zone statistical information to achieve color balance. Auto-focus means collecting statistics on image content and adjusting hardware actions of the camera module based on a statistical result. Color correction means correction performed on a color restoration degree of the RGB image obtained after white balance processing. For example, the RGB image is multiplied by a color correction matrix to achieve color restoration. This is because there is a specific deviation between a spectrum obtained by the image sensor and a spectrum perceived by human eyes. In this case, color restoration correction needs to be performed to present a normal image that approximates to perception of human eyes. Sharpening enhancement means processing performed on edge enhancement and high-frequency detail enhancement on an image to make the image clearer. Noise reduction means suppression operations performed on interference noise of an image, including spatial noise reduction, temporal noise reduction, color noise suppression, or the like. Optionally, the image processing may further include storage of image data or video data that is present in a processing process.

S156: Perform video/image encoding.

Image encoding or video encoding is performed on image data or video data obtained after image processing. A video/image encoding method may be an existing video/image encoding method. This is not limited in this disclosure.

S157: Perform data transmission.

Encoded image data or video data is transmitted. A data transmission method may be an existing data transmission method. This is not limited in this disclosure.

S158: Display the video/image.

The transmitted encoded video data or image data is decoded and decoded video data or image data is displayed. For example, a video is displayed in a main display area on a website display interface, and some captured images of an object may be displayed in a peripheral display area of the main display area. Optionally, during display of the video/image, a user instruction input may further be received, where the instruction input includes selecting a working mode or selecting a picture location in a manual mode.

Figure 17:
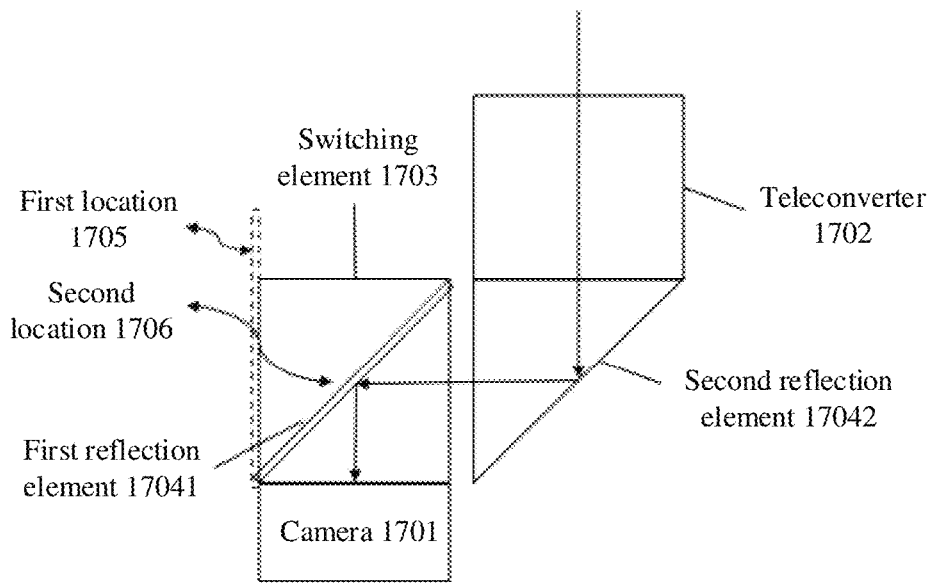
FIG. 17 is a schematic diagram of a structure of a surveillance module according to Embodiment 6 of this disclosure.

Embodiment 6 of this disclosure provides a surveillance module. FIG. 17 is a schematic diagram of a structure of a possible surveillance module.

The surveillance module includes a camera 1701, a teleconverter 1702, a switching element 1703, a first reflection element 17041, and a second reflection element 17042. The surveillance module may be applied to a surveillance scenario. The surveillance scenario includes a pedestrian surveillance scenario, a road vehicle surveillance scenario, or a home surveillance scenario.

The camera may use a zoom lens. The zoom lens is a lens whose focal length is variable within a specific range, to obtain fields of view of different widths, images of different sizes, and different scene ranges. The camera may include a lens and a light filter that are used for imaging. The light filter is configured to filter out interference light. In a possible implementation, the light filter may be an infrared cut-off filter, and can prevent light of another wavelength in an environment other than visible light from entering the system and improve an imaging effect.

In a possible implementation, a magnification range of the camera is [1, M], and M is a value greater than 1. Optionally, a value range of M includes [2, 30], and M may be an integer.

The teleconverter may use a fixed-focus lens. The teleconverter is an optical component configured to multiply a zoom ratio of the entire surveillance module. The teleconverter has a fixed zoom function, for example, a 2× teleconverter. In a specific use process, the teleconverter can be connected to the camera to double a focal length of the entire surveillance module.

The fixed-focus lens is a lens with a fixed focal length. In a possible implementation, a magnification of the teleconverter is N, and N is an integer greater than 1. Optionally, a value range of N includes [2, 5].

The surveillance module may be optical path folding structure as a whole, which means that when the teleconverter is switched to work together with the switching element 1703, reflection elements (the first reflection element 17041 and the second reflection element 17042), and the camera, an optical path when light passes through the surveillance module is folded. Specifically, the optical path folding structure means that when the switching element switches the reflection element to be at a second location or in a second working state, the optical path is changed after being reflected by the reflection element, that is, incident light and emergent light of the surveillance module do not overlap each other, or in other words, the emergent light is changed relative to the incident light.

In a possible implementation, the teleconverter includes K teleconverters, and a structure of at least one teleconverter is optical path folding structure. K is an integer greater than or equal to 1.

The reflection elements may include the first reflection element 17041 and the second reflection element 17042, and each of the reflection elements may be implemented in a form of a reflection mirror or a prism for reflecting light, to change an optical path of the light. A location of the first reflection element 17041 may be switched by the switching element, and a location of the second reflection element 17042 is fixed.

The switching element may be configured to change a location or a working state of the reflection element. When the first reflection element 17041 is at a first location 1705 or in a first working state, the optical path does not pass through the reflection element, and the camera performs image capture alone. When the first reflection element 17041 is at a second location 1706 or in a second working state, the optical path passes through the reflection element, and the reflection element is configured to reflect emergent light of the teleconverter to the camera along an incident optical axis of the camera, so that the camera and the teleconverter jointly perform image capture.

In a first possible implementation, the switching element is of a magnetic switching reflection-mirror structure. FIG. 6 is a schematic diagram of a structure of a magnetic switching reflection-mirror. A coil is wound on an iron core 601, and a magnet 602 is fastened at an upper end of a reflection mirror 603. When the coil is not energized, the magnet 602 and the iron core 601 attract each other, and the reflection mirror 603 is in a vertical state relative to the camera 1701, and a light propagation direction is not affected. In this case, the first reflection element 17041 is at the first location or in the first working state, and the camera performs image capture alone. When the coil is energized, the magnet 602 and the iron core 601 repel each other, the magnet drives the reflection mirror 603 to deflect to a slot location at a specific angle (for example, 45°) and stay, and the slot location overlaps an original optical path. Light enters a route through the teleconverter instead. A light propagation direction passing through the teleconverter is first deflected by one angle (for example, 90°) after a reflection module is passed through, and then deflected by another angle (for example, 90°) after the reflection mirror 603 is passed through. In this case, the first reflection element 17041 is at the second location or in the second working state, the optical path passes through the reflection element, and the reflection element is configured to reflect emergent light of the teleconverter to the camera along an incident optical axis of the camera, so that the camera and the teleconverter jointly perform image capture. It can be understood that a change in a magnetic logical relationship when the magnet is located at different locations falls within the protection scope of the present invention. None of the deflection angle of the reflection mirror 603, the deflection angle of the light, and the route are limited, and another light route corresponding to an optical path that can be folded also falls within the protection scope of this disclosure.

In a second possible implementation, the switching element is of a translation reflection-mirror structure. FIG. 7 is two schematic diagrams of structures of a translation reflection-mirror. A reflection mirror 701 that is of a translation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may be pushed to perform horizontal rotation on the guide rail under the driving of a translation driving module 702. The translation driving module 702 may be a motor or any other component that can provide kinetic energy. When the reflection mirror is at a location 703 that does not overlap the original optical path, the optical path may directly pass through, the first reflection element 17041 is at the first location or in the first working state, and the camera performs image capture alone. When the reflection mirror is translated by the translation driving module 702 and is at a location 704 that completely overlaps the original optical path, the first reflection element 17041 is at the second location or in the second working state, the optical path passes through the reflection element, and the reflection element is configured to reflect emergent light of the teleconverter to the camera along an incident optical axis of the camera, so that the camera and the teleconverter jointly perform image capture.

In a third possible implementation, the switching element is of a rotation reflection-mirror structure. FIG. 8 is a schematic diagram of a structure of a rotation reflection-mirror. A reflection mirror 801 that is of a rotation reflection-mirror structure is fastened in a frame. The reflection mirror may be a prism, a planar reflection mirror, or another component that can implement an optical path reflection function. The frame may be a frame made of any material. The reflection mirror and the frame each may be of any shape such as a rectangle, a square, or a circle. This is not limited in this disclosure. The frame including the reflection mirror is fastened on a guide rail and placed in an optical path at a specific angle (for example, 45 degrees) from an original optical path. The frame may rotate around a rotating shaft under the driving of a rotation driving module 802. The rotation driving module 802 may be a motor or any other component that can provide kinetic energy. When the reflection mirror is at a location 803 that does not overlap the original optical path, the optical path may directly pass through, the first reflection element 17041 is at the first location or in the first working state, and the camera performs image capture alone. When the reflection mirror is driven by the rotation driving module 802 to rotate and is at a location 804 that completely overlaps the original optical path, the first reflection element 17041 is at the second location or in the second working state, the optical path passes through the reflection element, and the reflection element is configured to reflect emergent light of the teleconverter to the camera along an incident optical axis of the camera, so that the camera and the teleconverter jointly perform image capture.

In a fourth possible implementation, the switching element is of an electrochromic material glass structure. FIG. 9 is a schematic diagram of a structure of electrochromic material glass. The electrochromic material glass 901 is integrated with a nanoparticle film in the glass. The nanoparticle film can be activated after the material is energized, so that the nanoparticle film is aggregated to form a reflection mirror. When a different voltage is switched to (for example, upon de-energization), the nanoparticle film can be removed and the reflection mirror becomes transparent glass. The electrochromic material glass 901 is placed in an optical path at a specific angle (for example, 45 degrees) from an original optical path. The material is transparent and is equivalent to a glass state 902 in a de-energized state, the optical path may directly pass through, the first reflection element 17041 is at the first location or in the first working state, and the camera performs image capture alone. The material can implement a total reflection function and is equivalent to a reflection mirror state 903 in an energized state, the first reflection element 17041 is at the second location or in the second working state, the optical path passes through the reflection element, and the reflection element is configured to reflect emergent light of the teleconverter to the camera along an incident optical axis of the camera, so that the camera and the teleconverter jointly perform image capture.

This disclosure further provides a surveillance apparatus. The surveillance apparatus includes the foregoing surveillance module and further includes a control module. The control module is configured to: determine a target magnification, compare the target magnification with a magnification of a camera, and set the magnification of the camera and control a switching element based on a comparison result. The control module may be a processor, and the processor may include one or more processing units. For example, the processor may include an application processor (AP), a modem processor, a graphics processing unit (GPU), an image signal processor (ISP), a controller, a video codec, a digital signal processor (DSP), a baseband processor, and/or a neural-network processing unit (NPU). The processor may alternatively be another general-purpose processor. The general-purpose processor may be a microprocessor, or the processor may be any conventional processor or the like. Different processing units may be independent components, or may be integrated into one or more processors.

The controller may be a nerve center and a command center of the surveillance module. The controller may generate an operation control signal based on instruction operation code and a time sequence signal, to complete control of instruction fetching and instruction execution.

A memory may further be disposed in the processor, and is configured to store instructions and data. It may be understood that the memory in the embodiments of this disclosure may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of example and not limitation, many forms of random access memories (RAM) may be used such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Figure 18:
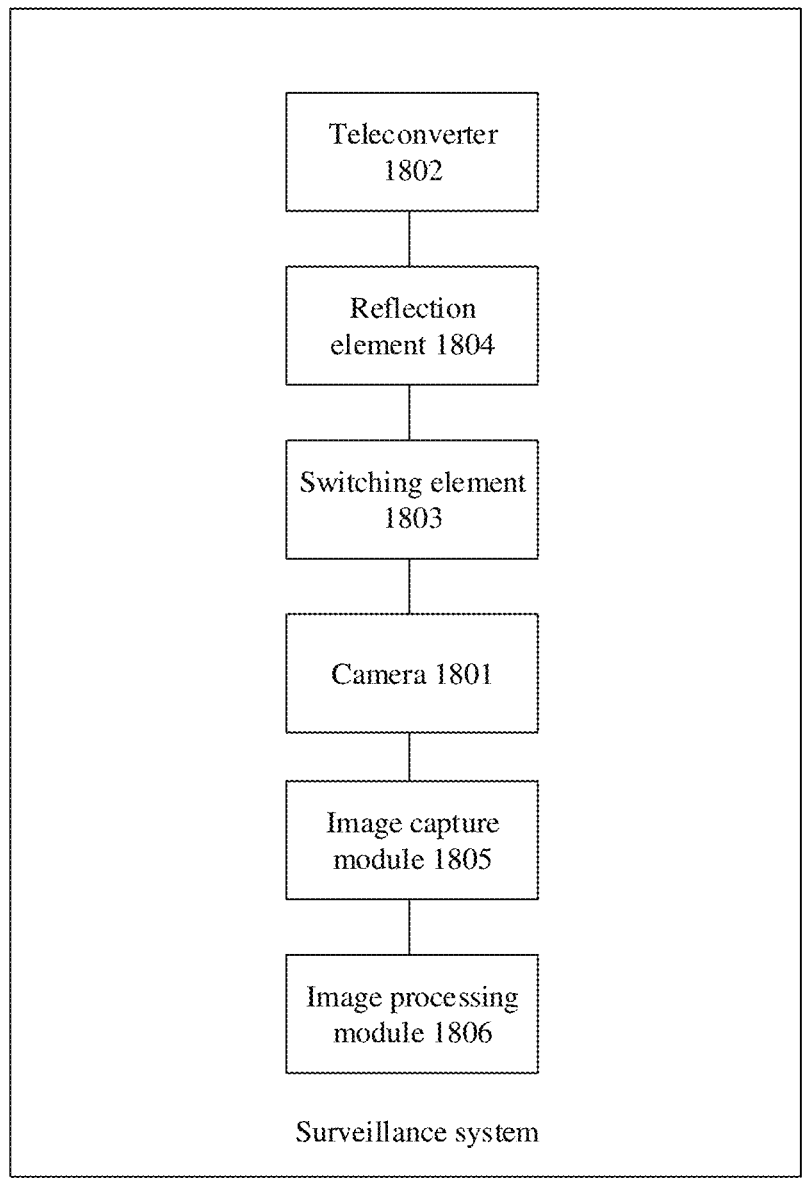
FIG. 18 is a schematic diagram of a surveillance system according to Embodiment 6 of this disclosure.

Embodiment 7 of this disclosure further provides a surveillance system. As shown in FIG. 18, the surveillance system includes a camera 1801, a teleconverter 1802, a switching element 1803, a reflection element 1804, an image capture module 1805, and an image processing module 1806 of the foregoing surveillance module.

The image capture module is configured to perform image capture, the image capture module may be an image sensor, and the image sensor captures an object image in real time by converting an optical signal obtained by a camera module into an electrical signal. The image sensor includes a charge-coupled device (CCD) sensor, a complementary metal-oxide-semiconductor (CMOS) sensor, or a graphene material sensor.

The image processing module is configured to perform image processing, and the image processing module may be an image processor, or may be any one of the foregoing other processors. The image processing includes image processing operations such as demosaicing, automatic exposure, automatic white balance, auto-focus, color correction, sharpening enhancement, and noise reduction performed on the image data. Demosaicing means processing a Bayer image to obtain an RGB image, and is a process of interpolating pixels with uneven luminance obtained by the image sensor into smooth pixels. Automatic exposure means automatic adjustment of an exposure time and a gain of the image sensor based on luminance statistical information fed back during the image processing, to adjust luminance of an image. Automatic white balance means automatic adjustment of an RGB gain of the image processing module based on white zone statistical information to achieve color balance. Auto-focus means collecting statistics on image content and adjusting hardware actions of the camera module based on a statistical result. Color correction means correction performed on a color restoration degree of the RGB image obtained after white balance processing. For example, the RGB image is multiplied by a color correction matrix to achieve color restoration. This is because there is a specific deviation between a spectrum obtained by the image sensor and a spectrum perceived by human eyes. In this case, color restoration correction needs to be performed to present a normal image that approximates to perception of human eyes. Sharpening enhancement means processing performed on edge enhancement and high-frequency detail enhancement on an image to make the image clearer. Noise reduction means suppression operations performed on interference noise of an image, including spatial noise reduction, temporal noise reduction, color noise suppression, or the like. Optionally, the image processing may further include storage of image data or video data that is present in a processing process.

Figure 16:
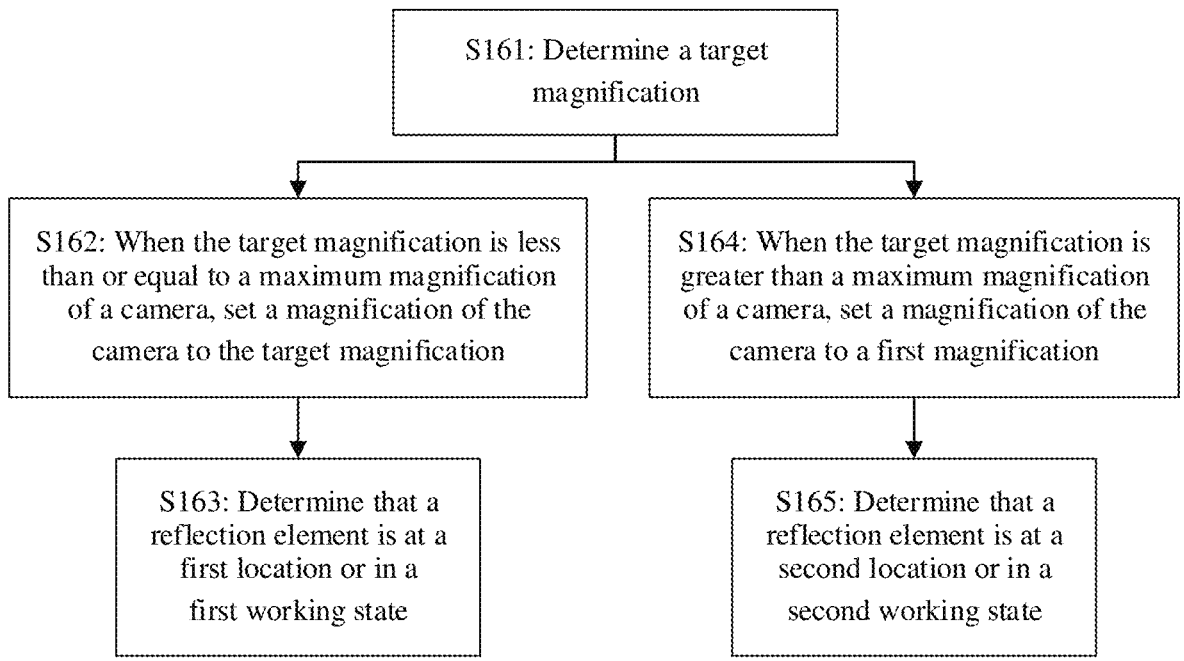
FIG. 16 is a flowchart of an optical path switching method according to Embodiment 7 of this disclosure.

Embodiment 8 of this disclosure provides an optical path switching method based on the foregoing surveillance module. FIG. 16 is a flowchart of the optical path switching method. The optical path switching method is applied to the surveillance module provided in Embodiment 6. The surveillance module is a camera module applied to a surveillance scenario. FIG. 17 is a schematic diagram of the surveillance module.

Specific implementation steps included in the optical path switching method are as follows.

S161: Determine a target magnification.

The determining a target magnification includes automatically determining the target magnification based on different object states or determining the target magnification according to an input instruction. The automatically determining the target magnification based on different object states may be: determining the target magnification based on an object size proportion, or determining the target magnification based on a type of an object. There is a determined correspondence between the target magnification and the object size proportion, and preferably there is a correspondence within one proportion range.

In a first possible implementation, a method for determining the target magnification is: determining an object size proportion of a target object in a currently captured image, and determining the target magnification based on the object size proportion. The target object is an object, for example, a pedestrian or a vehicle, that needs to be noticed in a picture photographed by the surveillance module. The object size proportion means a proportion of an object in a picture photographed by the surveillance module. For a same object type, there is a determined correspondence between a target magnification and an object size proportion of a target object in a currently captured image. Optionally, there is a determined correspondence between a target magnification and an object size proportion range of a target object in a currently captured image. When the size proportion of the object in the currently captured image is smaller, the target magnification needs to be larger to photograph the object more clearly. For example, when the size proportion of the object in the currently captured image is 20%, and the camera photographs the object at a 5× magnification, the object can be clearly presented. In this case, the target magnification is fivefold. Optionally, if the size proportion of the object in the currently captured image is 20% with a variation of 2%, that is, within a range (18% to 22%), when the camera photographs the object at a 5× magnification, the object can be clearly presented. In this case, the target magnification is fivefold. Clear presentation means that the object can satisfy a recognition requirement. For example, when the object is a human face, definition of the human face object needs to reach a degree that an identity of a target person can be recognized. If the object moves toward a location farther from the camera, when the object moves to a location and stays at the location, and the camera still performs photographing at a 5× magnification, a size proportion of the object in the captured image becomes 10%, and the object cannot be clearly presented. To still clearly photograph the object, a magnification of the camera needs to be adjusted to tenfold. In this case, it is determined that the target magnification is tenfold.

In a second possible implementation, a method for determining the target magnification is: determining a type of an object, and determining the target magnification based on the type of the object. There is a correspondence between the type of the object and the target magnification. When an object is at a location with a specific distance from the camera, different types of objects have different definition requirements. When the different types of objects satisfy a requirement for clear presentation, different camera magnifications are required. For example, if the type of the object is a license plate, when the license plate is 20 meters away from the camera, the license plate can be clearly recognized by photographing performed by the camera at a 2× magnification. In this case, the target magnification of the license plate object is fivefold. If the type of the object is a human face, when the human face is 20 meters away from the camera, because a definition requirement of facial recognition is higher, definition of the human face object cannot satisfy a requirement of accurate facial recognition by photographing the human face object by the camera still at a 2× magnification. Then, the camera needs to perform photographing at a 5× magnification to clearly recognize the human face. In this case, the target magnification of the human face object is fivefold.

In a third possible implementation, a method for determining the target magnification is: receiving a magnification input instruction, and determining the target magnification according to the magnification input instruction. The magnification input instruction may be manually input, or may be automatically input by a processor of a surveillance system based on a preset relationship between a type of an object and a required camera magnification, and between a size proportion of an object in an image and a required camera magnification. The surveillance system includes the surveillance module and a processor configured to control the surveillance module. For example, when the manually input instruction may be a manual operation on the surveillance module, a user enters an instruction for a 5× magnification by using a user interface of the surveillance system, and the input instruction indicates that the target magnification should be fivefold. For another example, through verification tests, when the object is a license plate and a size ratio of the license plate in an image captured by the surveillance module is 10%, if the camera performs photographing at a 5× magnification, definition of the license plate object can satisfy a recognition requirement of a license plate recognition system for a license plate, and recognition accuracy is greater than 98%. When the surveillance module is applied to a vehicle surveillance scenario, an input instruction of the processor of the surveillance system is an instruction for a 5× magnification, and the input instruction indicates that the target magnification should be fivefold. In this case, the camera photographs a license plate object at a fixed distance location at a 5× magnification. When the license plate object is at this location, a size ratio of the license plate object in an image captured by the surveillance module is 10%. It can be understood that, the method for determining the target magnification based on the magnification input instruction involves an interaction process. To be specific, a picture photographed based on an original target magnification can be viewed by the user, and then a user may determine whether the photographed picture satisfies a requirement. If the photographed picture satisfies the requirement, the original target magnification is maintained. If the photographed picture does not satisfy the requirement, adjustment may be made by using the user interface and an instruction is transmitted to the surveillance system.

S162: When the target magnification is less than or equal to a maximum magnification of the camera, set a magnification of the camera to the target magnification. That the target magnification is less than or equal to the maximum magnification of the camera means that the magnification of the camera can satisfy a requirement of the target magnification. In this case, the magnification of the camera is set to be equal to the target magnification, to satisfy an object definition requirement. A magnification range of the camera is [1, M]. In a possible implementation, a value range of M includes [2, 30]. When the target magnification is less than or equal to the maximum magnification of the camera, a control module is configured to make comparison between the target magnification and the magnification of the camera, and perform an operation step of setting the magnification of the camera to the target magnification.

S163: Determine that the reflection element is at a first location or in a first working state, and in this case, an optical path does not pass through the reflection element, and the camera performs image capture alone. The first location means that a location of the reflection element does not overlap an original optical path, and the reflection element cannot reflect light. The second working state is a working state in which the camera and the teleconverter jointly perform image capture. In a possible implementation, the control module controls the coil on the iron core 601 not to be energized. Optionally, the control module may further control the translation driving module 702 to translate the reflection mirror not to overlap the original optical path, or control the rotation driving module 802 to rotate the reflection mirror not to overlap the original optical path, or control the electrochromic material glass 901 not to be energized. The original optical path is an optical path in which light directly enters the camera without passing through the teleconverter.

S164: When the target magnification is greater than a maximum magnification of the camera, set a magnification of the camera to a first magnification, where a product of the first magnification and a magnification of the teleconverter is the target magnification, and the target magnification is not greater than a product of the maximum magnification of the camera and the first magnification. The magnification of the teleconverter is N. In a possible implementation, a value range of N includes [2, 5]. The teleconverter includes K teleconverters, and a structure of at least one teleconverter is optical path folding structure. In this case, a control module is configured to make comparison between the target magnification and the magnification of the camera, and control the switching element to change a location of the reflection element. In a possible implementation, a method for controlling the switching element to change a location of the reflection element is that the control module controls the coil on the iron core 601 to be energized. Optionally, a method for controlling the switching element to change a location of the reflection element may further be: The control module controls the translation driving module 702 to translate the reflection mirror to overlap the original optical path, or controls the rotation driving module 802 to rotate the reflection mirror to overlap the original optical path, or controls the electrochromic material glass 901 to be energized.

S165: Determine that the reflection element is at a second location or in a second working state, and in this case, an optical path passes through the reflection element, and the camera and the teleconverter jointly perform image capture. The second location means that a location of the reflection element overlaps an original optical path, and the reflection element can reflect light. The second working state is a working state in which the camera and the teleconverter jointly perform image capture.

The optical path switching method provided in this embodiment of this disclosure may be performed by an optical path switching apparatus. Functional modules of the optical path switching apparatus are obtained through division according to the foregoing method example. For example, functional modules may be may be divided by function, or at least two functions may be integrated into one processing module. The integrated module may be implemented in a form of hardware, or may be implemented in a form of a software functional module. It should be noted that division into the modules in the embodiments of this disclosure is an example, and is merely a logical function division. During actual implementation, another division manner may be used.

Figure 19:
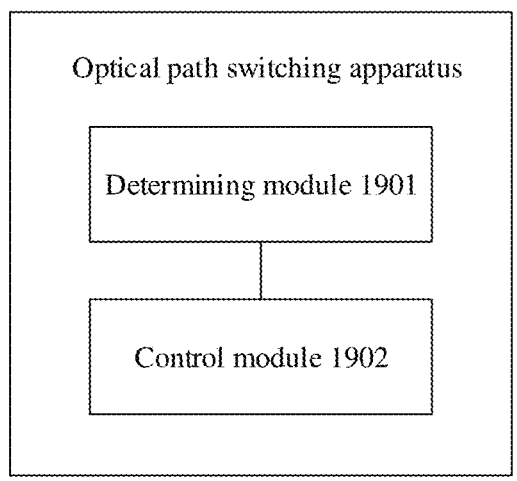
FIG. 19 is a schematic diagram of an optical path switching apparatus according to Embodiment 8 of this disclosure.

Embodiment 8 of this disclosure provides an optical path switching apparatus based on the foregoing surveillance module. FIG. 19 is a schematic diagram of the optical path switching apparatus. As shown in FIG. 19, the optical path switching apparatus may include a determining module 1901 and a control module 1902. The determining module 1901 is configured to support the optical path switching apparatus in performing the action of determining the target magnification in step S161 in the foregoing method embodiment. The control module 1902 is configured to support the optical path switching apparatus in performing the following actions in steps S162 to S165 in the foregoing method embodiment: When the target magnification is less than or equal to the maximum magnification of the camera, setting the magnification of the camera to the target magnification; and setting the reflection element to be at the first location or in the first working state, and performing image capture by using the camera; or when the target magnification is greater than the maximum magnification of the camera, setting the magnification of the camera to the first magnification, where the product of the first magnification and the magnification of the teleconverter is the target magnification, and the target magnification is not greater than the product of the maximum magnification of the camera and the first magnification; and setting the reflection element to be at the second location or in the second working state, and performing image capture by using both the camera and the teleconverter. All related content of the steps in the foregoing method embodiments may be cited in function descriptions of corresponding functional modules. Details are not described herein again.

Embodiment 9 of this disclosure provides a computer-readable medium, configured to store computer program code. The computer program is used to perform the method provided in Embodiment 3, Embodiment 5, or Embodiment 7. The readable medium may be a ROM or a RAM, and this is not limited in this embodiment of this disclosure.

Embodiment 10 of this disclosure further provides a computer program product. The computer program product includes computer program instructions. When the computer program instructions are executed, a corresponding apparatus is enabled to perform an operation corresponding to the foregoing method.

Embodiment 11 of this disclosure further provides a system chip. The system chip includes a processing unit and a communications unit. The processing unit may be, for example, a processor, and the communications unit may be, for example, an input/output interface, a pin, or a circuit. The processing unit may execute computer instructions, so that a chip in a communications apparatus performs any method provided in the foregoing embodiments of this disclosure.

Optionally, any communications apparatus provided in the foregoing embodiments of this disclosure may include the system chip.

Optionally, the computer instructions are stored in a storage unit.

Optionally, the storage unit is a storage unit inside the chip, such as a register or a cache. Alternatively, the storage unit may be a storage unit that is inside a terminal and that is located outside the chip, such as a ROM, another type of static storage device that can store static information and instructions, or a RAM. The processor mentioned above may be a CPU, a microprocessor, an ASIC, or one or more integrated circuits used to control program execution of the foregoing optical path folding methods. The processing unit and the storage unit may be decoupled, separately disposed on different physical devices, and connected in a wired or wireless manner to implement functions of the processing unit and the storage unit, to support the system chip to implement various functions in the foregoing embodiments. Alternatively, the processing unit and the memory may be coupled to a same device.

Embodiment 12 of this disclosure provides a terminal device. The terminal device may be an apparatus that has an image capture function, such as a smartphone, a tablet, a digital camera, a digital video camera, a surveillance camera, a vehicle-mounted camera, or an industrial camera, and may also be applied to the photography field, the automotive electronics field, the industrial machine vision field, or the like. The terminal device includes the optical path foldable apparatus in Embodiment 1, or the surveillance module or the surveillance system in Embodiment 6, or performs the method according to Embodiment 3, Embodiment 5, or Embodiment 7.

All or some of the foregoing embodiments may be implemented by using software, hardware, firmware, or any combination thereof. When a software program is used to implement the embodiments, the embodiments may be implemented completely or partially in a form of a computer program product. The computer program product includes at least one instruction. When the computer program instructions are loaded and executed on the computer, the procedure or functions according to the embodiments of this disclosure are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The terms "system" and "network" may be used interchangeably in this specification. The term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

Names may be assigned to various objects that may appear in this disclosure, for example, various messages/information/devices/network elements/systems/apparatuses/actions/operations/procedures/concepts. It can be understood that these specific names do not constitute a limitation on the related objects, and the assigned names may change with a factor such as a scenario, a context, or a use habit. Technical meanings of technical terms in this disclosure should be understood and determined mainly based on functions and technical effects that are of the technical terms and that are reflected/performed in the technical solutions.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this disclosure.

It may be clearly understood by a person skilled in the art that, for ease and brevity of description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

The foregoing descriptions are merely example embodiments of this disclosure, but are not intended to limit this disclosure in form. Although the example embodiments of this disclosure are disclosed above, the embodiments are not intended to limit this disclosure. By using the method and the technical content disclosed above, any person skilled in the art can make many possible changes and modifications on the technical solutions of this disclosure, or amend the technical solutions of this disclosure to be embodiments with equal effects through equivalent variations without departing from the scope of the technical solutions of this disclosure. Therefore, any simple amendments, equivalent variations, and modifications made on the foregoing embodiments according to the technical essence of this disclosure without departing from the content of the technical solutions of this disclosure shall fall within the protection scope of the technical solutions of this disclosure.

The invention claimed is:

1. An optical path switching method, wherein the method is applied to a surveillance module, the surveillance module comprises a camera, a teleconverter, a switching element, and a reflection element, wherein the camera uses a zoom lens, the teleconverter uses a fixed-focus lens and forms an optical path folding structure, an emergent optical axis of the teleconverter is unparallel to an incident optical axis of the camera, an incident optical axis of the teleconverter is parallel to the incident optical axis of the camera, the switching element is configured to change a location or a working status of the reflection element, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture; and the method comprises:
   determining a target magnification; and
      (i) when the target magnification is less than or equal to a maximum magnification of the camera, setting a magnification of the camera to the target magnification; and
         setting the reflection element to be at the first location or in the first working state, and performing image capture by using the camera; or
      (ii) when the target magnification is greater than the maximum magnification of the camera, setting the magnification of the camera to a first magnification, wherein a product of the first magnification and a magnification of the teleconverter is the target magnification, and the target magnification is not greater than a product of the maximum magnification of the camera and the first magnification; and
         setting the reflection element to be at the second location or in the second working state, and performing image capture by using both the camera and the teleconverter.

2. The method according to claim 1, wherein the determining of the target magnification comprises:
   determining an object size proportion of a target object in a captured image; and
   determining the target magnification based on the object size proportion, wherein
   a smaller object size proportion indicates a larger target magnification.

3. The method according to claim 1, wherein the determining of the target magnification comprises:
   determining a type of a target object; and
   determining the target magnification based on the type of the target object, wherein
   there is a correspondence between the type of the target object and the target magnification.

4. The method according to claim 1, wherein the determining of the target magnification comprises:
   receiving a magnification input instruction; and
   determining the target magnification according to the magnification input instruction.

5. The method according claim 1, wherein a magnification range of the camera is [1, M], the magnification of the teleconverter is N, and M and N are integers greater than 1.

6. The method according to claim 5, wherein a value range of M is [2, 30], and a value range of N is [2, 5].

7. The method according to claim 1, wherein the teleconverter comprises K teleconverters, and a structure of at least one of the K teleconverters forms the optical path folding structure.

8. An optical path switching apparatus, wherein the optical path switching apparatus is applied to a surveillance module, the surveillance module comprises a camera, a teleconverter, a switching element, and a reflection element, the camera uses a zoom lens, the teleconverter uses a fixed-focus lens and forms an optical path folding structure, an emergent optical axis of the teleconverter is unparallel to an incident optical axis of the camera, an incident optical axis of the teleconverter is parallel to the incident optical axis of the camera, the switching element is configured to change a location or a working status of the reflection element, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture; and the optical path switching apparatus comprises:
   a computer at least configured to:
   determine a target magnification; and
   perform control including:
      (i) when the target magnification is less than or equal to a maximum magnification of the camera, setting a magnification of the camera to the target magnification; and
         setting; the reflection element to be at the first location or in the first working state, and performing image capture by using the camera; or
      (ii) when the target magnification is greater than the maximum magnification of the camera, setting the magnification of the camera to a first magnification, wherein a product of the first magnification and a magnification of the teleconverter is the target magnification, and the target magnification is not greater than a product of the maximum magnification of the camera and the first magnification; and
         setting the reflection element to be at the second location or in the second working state, and performing image capture by using both the camera and the teleconverter.

9. The apparatus according to claim 8, wherein the computer is further configured to:
   determine an object size proportion of a target object in a captured image; and
   determine the target magnification based on the object size proportion, wherein a smaller object size proportion indicates a larger target magnification.

10. The apparatus according to claim 8, wherein the computer is further configured to:
 determine a type of a target object; and
 determine the target magnification based on the type of the target object, wherein
 there is a correspondence between the type of the target object and the target magnification.

11. The apparatus according to claim 8, wherein the computer is further configured to:
 receive a magnification input instruction; and
 determine the target magnification according to the magnification input instruction.

12. The apparatus according to claim 8, wherein a magnification range of the camera is [1, M], the magnification of the teleconverter is N, and M and N are integers greater than 1.

13. The apparatus according to claim 12, wherein a value range of M is [2, 30], and a value range of N is [2, 5].

14. The apparatus according to claim 8, wherein the teleconverter comprises K teleconverters, and a structure of at least one teleconverter forms the optical path folding structure.

15. A non-transitory computer-readable storage medium, wherein the computer-readable storage medium comprises computer instructions, and when the computer instructions are run on a computer, the computer is configured to perform at least the following operations:
 determining a target magnification; and
 (i) when the target magnification is less than or equal to a maximum magnification of a camera, setting a magnification of the camera to the target magnification; and setting a reflection element to be at a first location or in a first working state, and performing image capture by using the camera; or
 (ii) when the target magnification is greater than the maximum magnification of the camera, setting the magnification of the camera to a first magnification, wherein a product of the first magnification and a magnification of a teleconverter is the target magnification, and the target magnification is not greater than a product of the maximum magnification of the camera and the first magnification; and
 setting the reflection element to be at a second location or in a second working state, and performing image capture by using both the camera and the teleconverter;
 wherein the camera uses a zoom lens, the teleconverter uses a fixed-focus lens and forms an optical path folding structure, an emergent optical axis of the teleconverter is unparallel to an incident optical axis of the camera, an incident optical axis of the teleconverter is parallel to the incident optical axis of the camera, and when the reflection element is at a first location or in a first working state, the camera performs image capture alone, or when the reflection element is at a second location or in a second working state, the reflection element is configured to reflect emergent light of the teleconverter to the camera along the incident optical axis of the camera, so that the camera and the teleconverter jointly perform image capture.

16. The storage medium according to claim 15, wherein the determining of the target magnification comprises:
 determining an object size proportion of a target object in a captured image; and
 determining the target magnification based on the object size proportion, wherein
 a smaller object size proportion indicates a larger target magnification.

17. The storage medium according to claim 15, wherein the determining of the target magnification comprises:
 determining a type of a target object; and
 determining the target magnification based on the type of the target object, wherein
 there is a correspondence between the type of the target object and the target magnification.

18. The storage medium according to claim 15, wherein the determining of the target magnification comprises:
 receiving a magnification input instruction; and
 determining the target magnification according to the magnification input instruction.

19. The storage medium according to claim 15, wherein a magnification range of the camera is [1, M] and a value range of M is [2, 30], the magnification of the teleconverter is N and a value range of N is [2,5], and M and N are integers greater than 1.

20. The storage medium according to claim 15, wherein the teleconverter comprises K teleconverters, and a structure of at least one of the K teleconverters forms the optical path folding structure.

* * * * *